(12) United States Patent
Mason

(10) Patent No.: US 10,445,908 B1
(45) Date of Patent: Oct. 15, 2019

(54) COMPUTER HANDLING OF POLYGONS

(71) Applicant: Electronic Arts Inc., Redwood City, CA (US)

(72) Inventor: Ashton Mason, Twickenham (GB)

(73) Assignee: ELECTRONIC ARTS INC, Redwood City, CA (US)

(*) Notice: Subject to any disclaimer, the term of this patent is extended or adjusted under 35 U.S.C. 154(b) by 3 days.

(21) Appl. No.: 15/926,609

(22) Filed: Mar. 20, 2018

(51) Int. Cl.
*G06T 11/40* (2006.01)
*G06T 17/20* (2006.01)

(52) U.S. Cl.
CPC .............. *G06T 11/40* (2013.01); *G06T 17/20* (2013.01)

(58) Field of Classification Search
CPC ....... G06T 11/40; G06T 17/20; G06T 17/205; G06T 2210/36
See application file for complete search history.

(56) References Cited

U.S. PATENT DOCUMENTS

| 6,940,505 B1* | 9/2005 | Savine ............... G06T 17/20 345/419 |
| 8,237,710 B1* | 8/2012 | Marketsmueller .... G06T 11/203 345/419 |
| 2015/0015577 A1 | 1/2015 | Mason |

OTHER PUBLICATIONS

Dyer, et al. " Delaunay Mesh Construction" Eurographics Symposium on Geometry Processing. 2007.
Edelsbrunner "Geometry and Topology of Mesh Generation" Duke University. May 2000.

* cited by examiner

*Primary Examiner* — Jeffrey A Brier
(74) *Attorney, Agent, or Firm* — Middleton Reutlinger

(57) ABSTRACT

A computer implemented method of handling polygons is disclosed, including polygons which are complex and include degeneracies. The method includes receiving an input polygon with at least one boundary, the at least one boundary having at least one vertex joining edges of the polygon boundary; determining an edge direction for each of the edges; determining a signed exterior or interior angle of each vertex angle wherein, if the exterior angle between the edges is −pi or pi to within a predetermined threshold, determining the signed angle of the vertex angle including assigning a sign based on the winding of the edges of the polygon boundary, a sequence of angles of polygon vertices which can be directly computed or retrieved from a memory, the geometrical property that all exterior angles of the polygon sum to −2pi or 2pi, and the known sign of the polygon area.

22 Claims, 20 Drawing Sheets

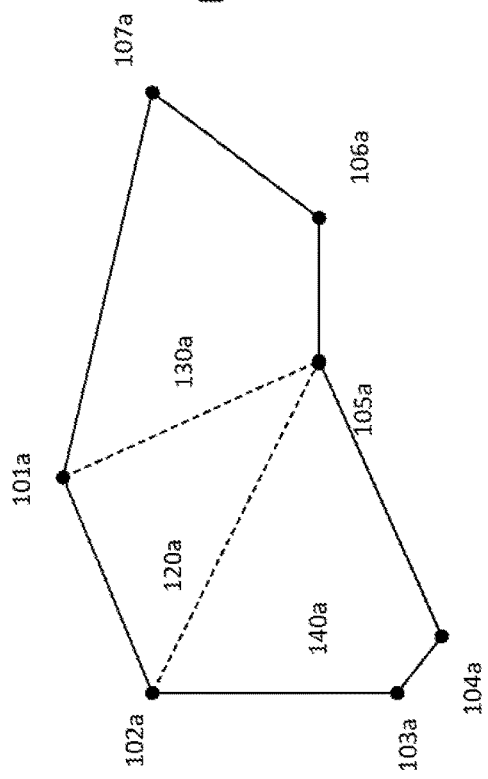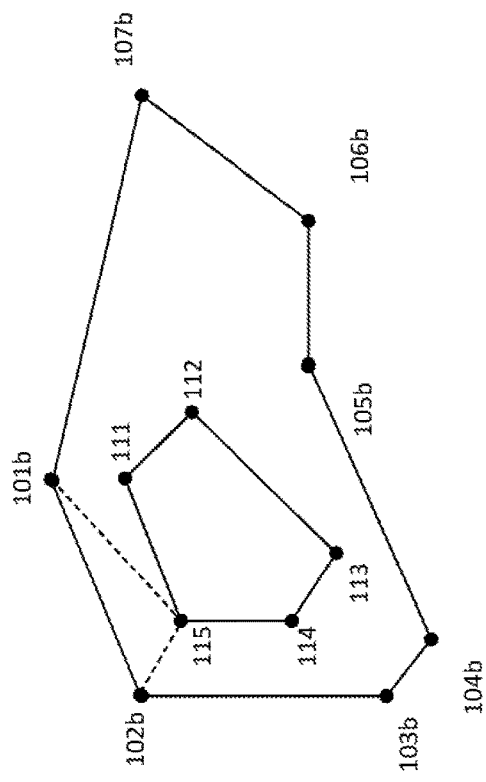

COMPUTER HANDLING OF POLYGONS

FIELD

The present disclosure relates to computer handling of polygons, including polygons which are complex and include degeneracies.

BACKGROUND

A polygonal mesh may be a collection of vertices, edges, and faces that define the shape and/or boundary of an object. A vertex may be a position (e.g. a point or location). An edge may be a connection between two vertices (e.g. may be a line connecting two vertices). A face may be a closed set of edges. For example, a triangular face may be formed with a closed set of three edges.

Polygonal meshes are used in or applied in various areas. For example, computer-aided manufacturing (CAM) processes may use polygonal meshes to define components or parts that are to be manufactured. In another example, polygonal meshes may be used in computer animation to create more lifelike movies or images. In a further example, game applications (e.g. video games, computer games) often use polygonal meshes to represent objects in a virtual environment. The meshes may be generated during game development and are rendered to form objects in virtual environments when the game is played by a user.

Polygonal meshes formed of triangles may be generated using triangulation. In general, computer-implemented triangulation includes constructing one or more triangular polygons to tessellate a region of 2D space. The triangles selected for triangulation are sometimes selected according to Delaunay criterion.

SUMMARY

A first aspect of this specification provides a computer implemented method, performed by one or more processors, the method comprising:

receiving an input polygon comprising at least one boundary, the at least one boundary comprising at least one vertex joining edges of the polygon boundary;

determining an edge direction for each of the edges, wherein for edges below a predetermined threshold length, determining an edge direction comprises assigning an edge direction based on edge directions of edges which can be directly computed or retrieved from a memory;

determining a signed angle of each vertex angle, the signed angle being the exterior or interior angle between the edges joined by the vertex;

wherein, if the exterior angle between the edges is –pi or pi to within a predetermined threshold, determining the signed angle of the vertex angle comprises:

assigning a sign based on the winding of the edges of the polygon boundary, a sequence of angles of polygon vertices which can be directly computed or retrieved from a memory, the geometrical property that all exterior angles of the polygon sum to –2pi or 2pi, and the known sign of the polygon area.

The method may comprise determining edge directions and vertex angles of edges and vertices that can be computed directly or retrieved from a memory.

For a polygon having a degenerate single vertex boundary, determining a signed angle of the exterior angle of the single vertex may comprise:

assigning a magnitude of pi; and
assigning a sign equal to the notional sign of the boundary.

The method may comprise, when the input polygon is a child polygon formed by subdividing a parent polygon for which the exterior angles have been previously determined:

determining exterior angles of the vertices of the child polygon based on previously determined exterior angles of the parent polygon.

The method may comprise storing determined edge directions and determined signed angles in a memory.

The method may comprise performing a recursive triangulation process comprising:

providing a first input polygon as said input polygon; and
dividing the first input polygon into a triangle and at least one child polygon, providing the at least one child polygon as said input polygon, wherein the edge directions and signed vertex angles of the child polygon are determined based on the edge directions and signed vertex angles of said first input polygon.

For edges below a predetermined threshold length, determining an edge direction of a triangle during triangulation may comprise:

determining the orientation of adjacent edges of the polygon boundary; and assigning an initial direction of the preceding adjacent edge if the vertex joining the adjacent edges is concave; and assigning an initial negated direction of the preceding adjacent edge if the vertex joining the adjacent edges is convex or straight.

The method may comprise determining winding angles of vertices of the input polygon by:

computing a sum of a series of signed angles from a reference vertex, following edges of the polygon boundary in a selected winding direction of the polygon, where each angle term is the angle between the respective directions from the reference vertex to two successive polygon vertices, encountered in the selected winding direction.

The winding angle of each vertex may be determined relative to a reference direction, and the first angle in the sum of a series of signed angles may be the angle between the first edge and the reference direction.

If an angle between the reference direction and the first edge is below a predetermined threshold such that the reference direction and first edge are close to coincident, and if the sign of the winding angle cannot be retrieved from a memory, determining the first angle may comprise:

assigning the angle a value of –pi if the winding angle is computed in positive winding order, or a value of pi if the winding angle is computed in negative winding order.

For further angle terms of the angle sum that are the signed angles between the respective directions from the reference vertex to two successive polygon vertices, in the selected winding direction:

if a further angle term is determined to be –pi or pi to within the predetermined threshold such that the respective directions are close to opposite each other; and if the sign of the further angle term cannot be retrieved from a memory, determining the further angle term may comprise:

computing a tracked angle sum comprising the angle of the first edge relative to the reference direction plus the sum of the signed exterior angles of subsequent vertices; and assigning the sign of the further angle term based on the sign of the tracked angle sum such that if the tracked angle sum is positive, the sign of the further angle term is determined to be positive, and if the tracked angle sum is negative, the sign of the further angle term is determined to be negative.

The method may comprise:

for a direction between the reference vertex and a polygon vertex wherein the distance between the reference vertex and the polygon vertex is below a predetermined tolerance threshold:

assigning the direction such that it corresponds to the direction of the immediately preceding edge leading to the polygon vertex, or the negated edge direction of the immediately preceding edge, depending on the winding order in which the winding angle is computed.

The method may comprise:

testing whether a target vertex of a one-boundary polygon is mutually visible from a reference vertex of the polygon with respect to the polygon boundary.

The method may comprise:

classifying the target vertex as either in shadow or not in shadow, from the point of view of the reference vertex, wherein a target vertex that is in shadow is determined not to be visible from the reference vertex.

The target vertex may be classed as being in shadow if it lies within one or more shadow regions, wherein a shadow region is a part of the polygon occluded from the reference vertex by a series of one or more connected polygon edges and is bounded by a silhouette vertex, wherein a silhouette vertex is a concave vertex incident to one of the occluding edges and whose immediately incident edges both lie to one side of a viewing line constructed from the reference vertex through the silhouette vertex, such that one immediately incident edge that faces toward the reference vertex and the other immediately incident edge faces away.

The method may comprise:

determining that a given vertex is silhouette with respect to the reference vertex if the respective angles of the pair of edges incident to the given vertex, oriented to face away from the given vertex, measured with respect to a viewing direction from the reference vertex to the given vertex, are either both positive or both negative.

If the angles of the pair of edges incident to the given vertex are both either –pi or pi, to within a tolerance threshold, determining which of the edges incident to the given vertex the shadow region is incident to may comprise:

calculating the winding angle of the reference vertex, with respect to the negated viewing direction, in positive and negative winding order respectively; and determining that the reference vertex is located on the side of the given vertex on which the winding angle is zero; and determining that the shadow region lies on the opposite side of the given vertex.

The method may comprise, if a vertex is determined to be silhouette, determining that the given vertex does not cast a shadow with respect to the reference vertex if the winding angle of the reference vertex around the given vertex, with respect to the negated viewing direction, following the edges on the non-shadow side of the given vertex, is non-zero.

The method may comprise testing the target vertex for inclusion in each identified shadow region by:

computing the winding angle of the target vertex around the silhouette vertex that defines that shadow region, relative to the viewing direction, following the boundary edges on the shadow side of the silhouette vertex; and determining that the target vertex is inside the shadow region if the shadow region lies on the positive winding angle side of the silhouette vertex and the winding angle of the target vertex relative to the viewing direction is negative, or if the shadow region lies on the negative winding order side of the silhouette vertex and the winding angle of the target vertex relative to the viewing direction is positive.

When performing triangulation of the input polygon, the method may further comprises rejecting triangles that would collide with or cross the polygon boundary by testing the visibility of a candidate triangle vertex from each of the vertices of the triangle base edge in the polygon boundary.

A second aspect of this specification discloses apparatus comprising one or more processors and a memory, the memory comprising instructions that, when executed by the one or more processors, cause the apparatus to perform:

receiving an input polygon comprising at least one boundary, the at least one boundary comprising at least one vertex joining edges of the polygon boundary;

determining an edge direction for each of the edges, wherein for edges below a predetermined threshold length, determining an edge direction comprises assigning an edge direction based on edge directions of edges which can be directly computed or retrieved from a memory;

determining a signed angle of each vertex angle, the signed angle being the exterior or interior angle between the edges joined by the vertex;

wherein, if the exterior angle between the edges is –pi or pi to within a predetermined threshold, determining the signed angle of the vertex angle comprises:

assigning a sign based on the winding of the edges of the polygon boundary, a sequence of angles of polygon vertices which can be directly computed or retrieved from a memory, the geometrical property that all exterior angles of the polygon sum to –2pi or 2pi, and the known sign of the polygon area.

This specification also discloses a non-transitory computer readable medium storage having instructions that, when executed by a processing device, cause the processing device to perform operations comprising:

receiving an input polygon comprising at least one boundary, the at least one boundary comprising at least one vertex joining edges of the polygon boundary;

determining an edge direction for each of the edges, wherein for edges below a predetermined threshold length, determining an edge direction comprises assigning an edge direction based on edge directions of edges which can be directly computed or retrieved from a memory;

determining a signed angle of each vertex angle, the signed angle being the exterior or interior angle between the edges joined by the vertex;

wherein, if the exterior angle between the edges is –pi or pi to within a predetermined threshold, determining the signed angle of the vertex angle comprises:

assigning a sign based on the winding of the edges of the polygon boundary, a sequence of angles of polygon vertices which can be directly computed or retrieved from a memory, the geometrical property that all exterior angles of the polygon sum to –2pi or 2pi, and the known sign of the polygon area.

BRIEF DESCRIPTION OF THE DRAWINGS

Embodiments of the specification will now be described, by way of example only, with reference to the accompanying drawings in which:

FIG. 1a illustrates triangulation of a simply polygon;

FIG. 1b illustrates triangulation of a complex polygon;

DETAILED DESCRIPTION

Figure 2:
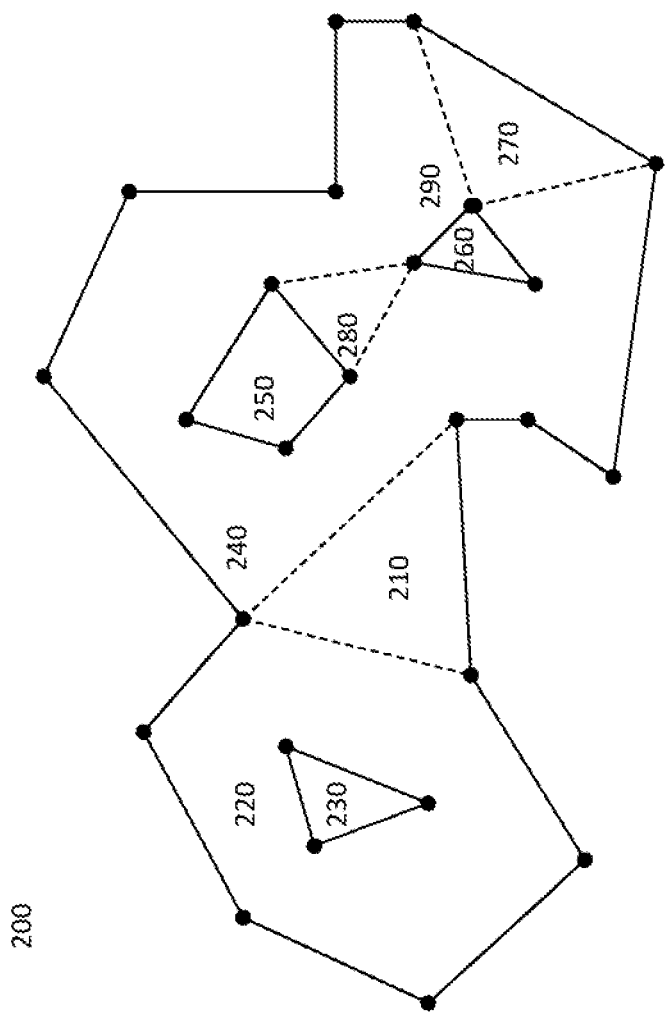
FIG. 2 illustrates triangulation of a complex polygon including multiple holes.

The present disclosure provides for a robust computer-implemented method handling polygons.

This may have particular applications in mesh triangulation for polygonal meshes involving degenerate faces.

The present disclosure describes computer-implemented handling of 2D polygons, with application to triangulation of faces of 3D meshes, including non-planar mesh faces, by means of planar projection. The methods described are not limited to simple 2D polygons with one boundary, and can accept complex polygons with multiple boundaries. Importantly, the methods described can accept degenerate input including polygons with either very short edges, or very small vertex angles, or both. Specifically this includes geometrically ambiguous cases where the directions of polygon edges cannot be reliably computed from the positions of their vertices, or where the angles of polygon vertices cannot be reliably computed from the directions of their incident edges, alone.

The computer-implemented method may make use of Delaunay triangulation. However, it will be recognised that any suitable triangulation method may be used.

Complex polygonal meshes may be generated by computer-implemented Constructive Solid Geometry (CSG) operations on meshes computed, for example, as part of the authoring of fractured meshes for use in computer game in-game destruction. In this case, the CSG may compute Boolean set operators (e.g. union, intersection, or subtraction) on pairs of volumes described by closed, two-manifold boundary meshes. In the process of in-game destruction, faces of operand meshes may be clipped by the faces of other meshes, resulting in complex concave faces with multiple holes, and therefore arbitrary number of boundaries. The fragments of the original mesh are often generated offline and loaded to the game during run time, although the meshes may alternatively be triangulated during run time. These faces are decomposed into convex faces for a number of reasons. For example, computer implementations of CSG may be unable to handle meshes with concave faces as input. Concave faces may each be decomposed into a plurality of convex triangles by triangulation, utilising the methods described in the present disclosure. These methods allow robust triangulation of complex polygons with degeneracies, which may be generated by fracturing meshes.

Although mesh processing algorithms such as CSG often require meshes with convex faces as input, there are typically few other restrictions on the quality of the input mesh faces. Indeed, meshes with degenerate faces are common. There are also no constraints on the arrangement of the operand meshes whose intersection, subtraction, etc. is computed. Moreover, artists often author meshes with some features aligned, or nearly aligned, with features of another mesh. As a result, complex situations in which the input meshes overlap in ambiguous ways occur frequently. In situations where features of the faces of one operand mesh align, or nearly align, with features of the faces of the other operand mesh, the generated output meshes may contain poorly-conditioned clipped faces with either very short edges, or very small vertex angles, or both. Scenarios that are challenging geometrically, and thus also computationally, may arise where the face features introduced by clipping are vanishingly near to existing edges or vertices. As a result, the clipped faces produced may be degenerate, with near-zero-length edges, near-zero vertex angles, and near-zero areas. Due to limitations of finite-precision floating point calculations, very small values may be as hard to handle as ones that are exactly zero. The present disclosure describes a method which addresses these challenges. The method allows the faces of such meshes to be triangulated such that they can be replaced by a plurality of convex triangles, and may therefore be easier to handle in subsequent processing than meshes which include concave faces.

The present disclosure involves computing the direction of each polygon edge and the angle of each polygon vertex only once. Accordingly, the edge directions and vertex angles may be pre-computed for the input polygon on input, and treated as known from that point onwards. When child polygons remain, after the creation of triangles within parent polygons during recursive triangulation, the known geometry of the parent polygons are inherited in the child polygon, which may reduce computational burden and avoid the introduction of contradictory geometry. The geometry of edges and angles present in the child polygon but not present in the parent polygon may be computed rigorously in order to ensure consistency with other known geometry.

The present disclosure describes a computer-implemented method which may better deal with numerically noisy input geometry. Numerical noise arises in meshes due to the accumulation of arithmetic error in the processing steps used to produce the mesh geometry. The noise complicates subsequent geometric processing because it causes notionally identical values to drift apart and reduces confidence in the accuracy of numerical computations, making it difficult to tell robustly, for example, whether one computed numerical value is equal to another. Two different computations of notionally the same numeric value are liable to differ marginally by a small amount of numeric noise. As a result, naively clipped faces may contain multiple different vertices at essentially the same geometric point, differing in location only by noise, and connected by edges that are vanishingly short, yet not strictly zero-length. In the same way, naively clipped faces may contain pairs of adjacent edges that are essentially coincident, connected by vertices with vanishingly small angles. Where multiple vertices or edges in a face coincide, mesh processing methods such as triangulation that are sensitive to numeric calculations are liable to make contradictory choices, classifying geometry differently in earlier and later steps. This leads to inconsistent output, program error, and early termination. Since this kind of geometry is common in many practical applications such as CSG, the ability to handle it robustly in triangulation is critical to the ability to generate, render, and edit complex meshes automatically and without error, and without the need for significant manual author input.

In the following, actions are taken by a processor (which may comprise multiple cores and/or multiple discrete processor devices) under control of a computer program. As such the actions are taken by a programmed processor, or more generally processing means. The processor may include part of a polygon processing module configured to process polygons. In addition, a memory may include part of the polygon processing module. The memory may be configured to store data required for polygon processing, and may also store computer program instructions which, when executed by the processor, is configured to process polygons in accordance with the principles set out in the present disclosure.

The methods described herein may be utilised in constrained triangulation. Constrained triangulation of simple 2D polygons involves triangulation within a 2D polygonal boundary. In constrained triangulation, the initial boundary polygon is the seed polygon which provides the starting point for triangulation. The triangulation is recursive in that a stack of polygons to be triangulated is maintained, seeded with the initial boundary polygon. The stack is a data structure containing a sequential collection of polygons, and is stored in a memory. The processor is configured such that in each recursion, a polygon is popped off (i.e. taken from the top of) the stack and a new triangle is constructed within it. However, it will be recognised that a stack need not be utilised, and that triangulation may be performed in any suitable way.

The processor may be configured to construct new triangles from existing boundary edges by selecting a base edge, the base edge having two vertices, and then selecting a third vertex to complete a triangle, as can be seen for example in FIG. 1a. In the example of FIG. 1a, the polygon vertices 101a and 102a are joined with vertex 105a to form a triangle 120a and two child polygons, 130a, 140a. Candidates for the third vertex may include only vertices of the current polygon, excluding those of the chosen base edge. At each recursion, construction of a triangle subdivides the remaining polygon into independent child polygons. In triangulation of simple polygons of one boundary, such as the polygon illustrated in FIG. 1a, each independent child polygon, such as child polygons 130a and 140a, is also a simple polygon that is pushed onto the stack, ready to be subdivided in the next recursion. Degenerate child polygons of less than three vertices may remain when the constructed triangle contains two, rather than just one, edge from the original polygon. These can be, and typically would be, discarded by the processor when triangulating simple polygons.

Complex polygons, such as that illustrated in FIG. 1b, are those which include two or more boundaries. The polygon illustrated in FIG. 1b includes an outer boundary formed by vertices 101b-107b, and a hole boundary formed by vertices 111-115.

For general polygons, the triangulation process may be more complex. In complex polygons with holes and therefore multiple boundaries, constructed triangles do not generally subdivide the remainder of the polygon into simple polygons.

For example, as can be seen from FIG. 2, triangle 210 subdivides the polygon 200 into the child polygon 220 containing internal hole 230, and child polygon 240 containing internal holes 250 and 260. Therefore, on subdivision of a polygon with holes by the creation of a triangle, each of the two independent child polygons created contains a subset of the holes. The stack in this case may therefore be configured to hold such complex polygons, which may include internal holes. When complex polygons are popped off the stack by the processor, the processor may be configured such that constructed triangles are only formed from base edges located on the outer boundary of the polygon. Doing so serves to either subdivide the polygon into two smaller child polygons (as can be seen in the case of constructing triangle 210), or to merge a single hole boundary into an outer boundary (as can be seen in the case of constructing triangle 270). In contrast, if edges of internal holes are used as a base edge, the constructed triangle may merely alter or merge the boundaries of internal holes (as can be seen in the case of triangle 280).

When the processor merges a hole boundary into an outer boundary, this creates a degenerate outer boundary that visits one of its vertices twice. As can be seen in FIG. 2, triangle 270 causes the boundary of hole 260 to be merged into the outer boundary of the remaining child polygon. The vertex 290 is therefore visited by the outer boundary of the remaining child polygon twice, and is therefore a degenerate vertex.

It can therefore be seen that triangulation of complex polygons can result in degeneracies which may be difficult to handle using conventional triangulation methods. As a result, triangulation may break down and more author input may be required in order for fractured meshes to be generated. Therefore, the present disclosure sets out a method of handling such degeneracies.

In accordance with an aspect of the present disclosure, the processor is configured to make use of consistent assignment of positions to polygon vertices, directions to polygon edges, and angles to polygon vertices. This will now be described in more detail.

For edges of polygons having a non-zero length, the direction of the polygon edge may be calculated by any suitable method. For example, the processor may be configured to determine the normalised vector between the vertices joined together by the edge.

However, for edges with lengths of zero and which therefore connect two coincident vertices, there is no obvious choice of direction. A processor configured to calculate edge directions using conventional schemes may also struggle merely when the edges become very short. Rather than attempt to detect and remove such degenerate geometry, the present disclosure makes the processing tolerant of their presence. It therefore provides a method which can be performed by a processor such that the processor is capable of addressing edges with zero or near-zero lengths, which may occur in mesh faces produced, for example, by clipping performed during CSG operations.

In accordance with aspects of the present disclosure, very short edges (including zero-length edges) are consistently assigned a reasonable direction. The direction assigned is based on a predetermined condition. The predetermined condition may be based on the edge direction of the edge encountered directly previously to the zero-length or near-zero-length edge, when the edges are enumerated in polygon winding order.

The assigned directions are recorded and stored in a memory, and they are maintained throughout computation of further edge directions. That is, whenever a direction is assigned to an edge, this direction may be recalled from the memory to be used in computation of further edge directions.

For an initial input polygon, the processor is configured to classify all edges in the polygon boundary as either zero-length or not. That is, the processor is configured to identify each edge as having zero-length or non-zero-length. Edges having a computed length less than or equal to a given small tolerance are determined by the processor to be edges having zero-length. Edges having a length greater than the given tolerance are determined by the processor to be edges having non-zero length.

Following determination of edge lengths, the directions of all polygon edges are then determined by the processor, according to a predetermined condition. The processor may be configured to compute the directions of all non-zero-length edges, which can be computed reliably, as a first step. Then, the processor may be configured to assign reasonable but well-defined and consistent directions to the zero-length edges, using some predetermined condition. The processor may, for example, base the direction of each zero-length edge on the direction of the immediately preceding edge. In this case the processor may assign directions to edges in winding order around the polygon, starting at any non-zero-length edge picked at random, and assigning any zero-length edge encountered a direction identical to the preceding edge, copied to the current edge. Other approaches of assigning zero-length edge directions are possible and equally valid as long as they are consistent. In other examples, the direction of a zero-length edge may be based on the direction of the following edge, or some combination of the directions of nearby edges. In each case the important criterion is that edge directions are assigned plausibly and consistently where the geometry itself offers no reliable value. By consistent application of the same approach for all edges, the processor may ensure the consistency of the overall geometry.

If all the edges of a boundary are zero-length, then this indicates that the boundary lies entirely at a single point. Accordingly, the choice of edge directions is arbitrary. In embodiments, the processor may be configured to assign the edge directions in any suitable and consistent way determined according to the program. It may be useful to assign the arbitrary edge directions such that the edge directions of all edges over the whole boundary cancel out, and the total net notional change in direction is zero. For example, in one embodiment, one edge may be assigned a positive X direction and the remainder may be assigned a negative X direction.

Once the directions of polygon edges have been determined, the angles of the polygon vertices are computed. In some embodiments according to the present disclosure, the angles which are determined by the processor may be the exterior vertex angles. Determination of exterior angles makes use of the mathematical concept that the sum of the exterior angles of the vertices of any positive polygon, i.e. with positive area, always sums to 2 pi (and the exterior angles of a negative polygon sum to −2pi). However, it will be recognised that some embodiments may be phrased in terms of vertex interior angles or any other suitable angle.

Figure 3:
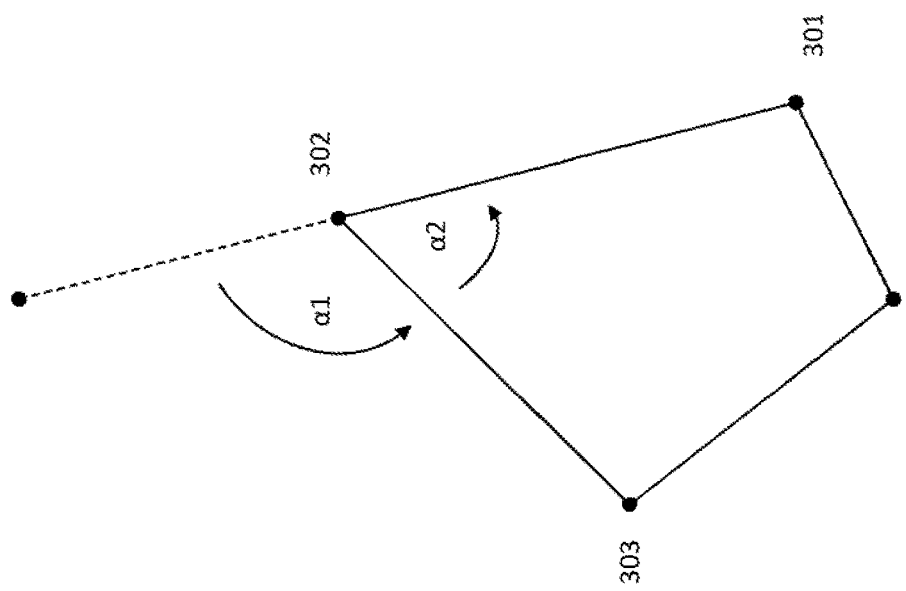
FIG. 3 illustrates determination of exterior angles of a polygon.

For a polygon with three successive vertices u, v, and w, such as 301, 302, 303 illustrated in FIG. 3, the exterior angle of polygon vertex v is the signed angle $\alpha 1$ between the directions of the directed edges uv and vw, that is 301, 302, and 302, 303 in the case of FIG. 3. The exterior angles are measured in winding order. In contrast, the interior angle of vertex v is the signed angle $\theta 2$ between vw and vu, that is 302, 303 and 302, 301 in the case of FIG. 3, where vu has direction opposite to uv.

In some embodiments, the computation of the vertex angles may be determined based on the interior angle, noting that the interior angle of a vertex is always pi minus the exterior angle, and vice versa. However, the sum of the interior angles of the vertices of a polygon is dependent on the number of polygon edges, and so using the exterior angles may cause computation to be more straightforward compared to using interior angles. Therefore, in many embodiments of the present disclosure, the computation of the vertex angles is determined based on the exterior angles.

Some polygons may include sequences of adjacent vertices in a boundary which are coincident with one another. As described above, in such circumstances the zero-length edges joining such coincident vertices may be assigned notional directions that are arbitrary but plausible and consistent, according to a method as described. In such cases the angles of the vertices are computed as usual in the obvious way, using the assigned directions of the edges. In the example where each zero-length edge is assigned the direction of the immediately preceding edge (in winding order), this naturally produces angles of zero for all but the last successive coincident vertex, which takes on the 'true' angle, i.e. that between the preceding and following non-zero-length edges. This may help to avoid incorrectly counting the angle multiple times at each of the successive vertices, ensuring that the overall change in direction between the incoming and outgoing non-zero-length edges is correctly accounted. However, it will be recognised that any other suitable convention for assigning edge directions may be adopted, as described earlier, and that any such convention will naturally produce vertex angles that account correctly, if the assignment of edge directions is plausible and consistent. For example, it is clear that it need not be the final vertex which takes on a non-zero angle, and it may be any other suitable vertex, such as the first, second, etc. The convention may be selected by the skilled person.

Figure 4:
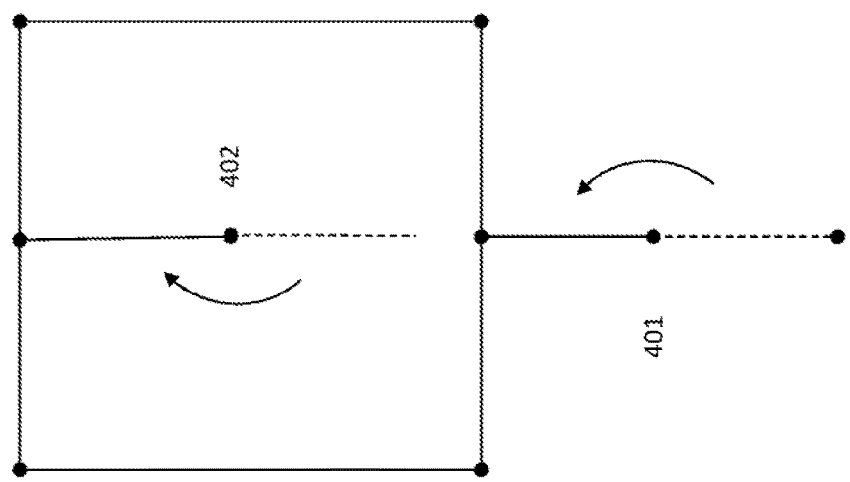
FIG. 4 illustrates determination of exterior angles of a polygon including coincident edges.

In general, the signed exterior angle between the directions of two edges incident to a vertex can be computed by the processor without much difficulty. However, the computation breaks down when the incident edges are coincident, or very close to being coincident. Such cases may be characterized by noting that the naively calculated exterior angle is approximately either −pi or +pi. Because the exterior angles of −pi and +pi both occur when the incident edges are parallel and coincident, they can't be distinguished from the pair of edges alone, and so the sign of the angle in this case can't be reliably determined. The sign depends on whether the second edge is wound clockwise or counter-clockwise around the vertex, with respect to the first edge. The winding is only known in the broader context of the polygon and is not a property of the incident edges alone. This can be seen, for example, in FIG. 4. The exterior angle of 401 is pi, and that of 402 −pi, even though the pairs of edges incident to each vertex are geometrically similar.

When determining the angles of the vertices of a polygon boundary, the exterior angles of all vertices may initially be computed naively by the processor, marking any angles computed as pi or −pi (to within a small angle tolerance) as having unknown sign. The exact signed values of such angles can then be determined according to a chosen convention, based on polygon winding order and the sign of the polygon area, if this is known from the context (i.e. positive for the outer boundary and negative for hole boundaries).

If a boundary contains only one vertex with exterior angle of unknown sign, the true value of the angle, including its sign, can be inferred from the fact that the sum of the exterior angles of a positive polygon is always 2pi (and that of a negative polygon being −2pi). By summing the known angles, the unknown angle can be determined as the only possible value that makes the whole sum either 2pi or −2pi. This applies even when the sign of the boundary is not known a priori, since arithmetically only one choice can make the absolute magnitude of the total sum 2pi.

Figure 5:
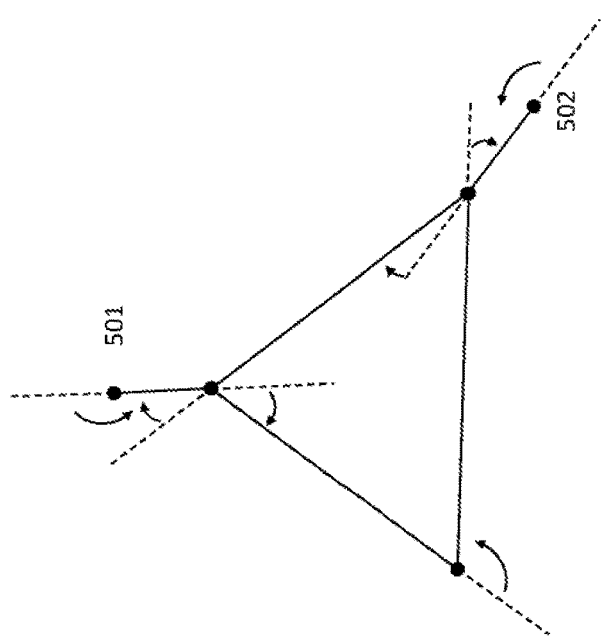
FIG. 5 illustrates determining exterior angles for a polygon having exactly two angles of unknown sign.

If a boundary contains exactly two vertices with exterior angles of unknown sign, the processor may deduce that both angles are positive, or both negative, depending on the sign of the boundary, if the known angles sum to zero. For example, as shown in FIG. 5, vertices 501 and 502 are each joined to a triangle by degenerate pairs of coincident edges. The exterior angles of each 501 and 502 are determined to be pi (i.e. with positive sign) as the angles of the other polygon vertices sum to zero and the polygon boundary is known to have positive area, implying that the sum of the two missing angles must be 2pi. This implies in turn that the incident edges are wound anticlockwise at both 501 and 502. In some embodiments the true angles may be computed from the naively computed angles by negating them as required, rather than simply assuming rounded values of −pi or +pi.

Figure 6:
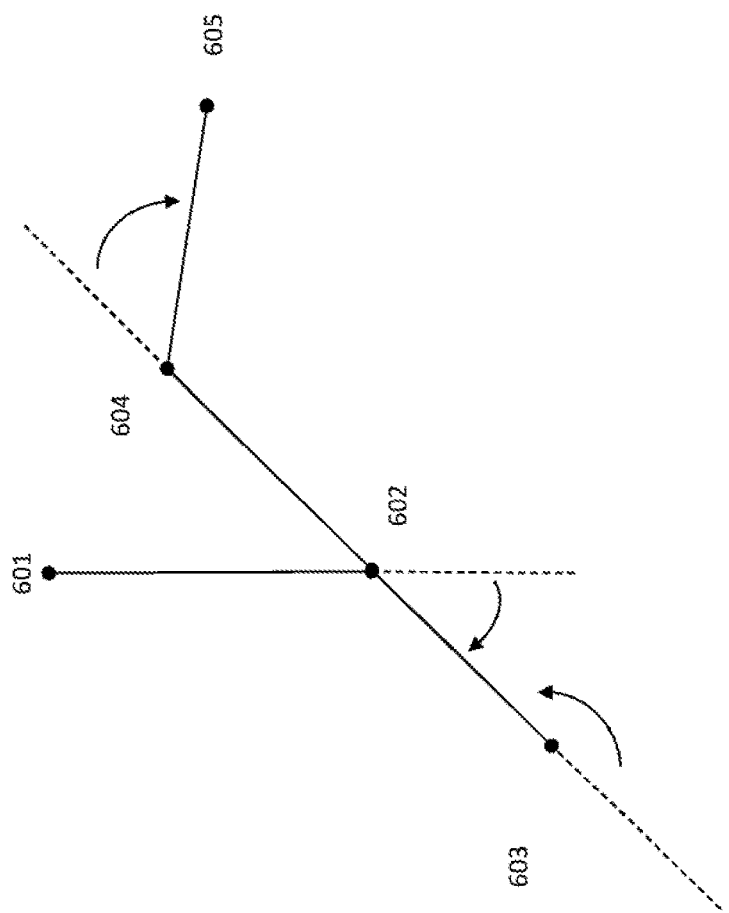
FIG. 6 illustrates determining exterior angles of a polygon.

For boundaries not matching these cases, the exact signed angles of any polygon vertices whose angles remain unknown may be computed by the processor by analysis of the polygon edges adjacent to each of those vertices. Analysing adjacent edges may involve searching outwards in each direction on the boundary away from a vertex of unknown sign, and stopping on encountering a pair of edges whose directions are not parallel either with each other or with the pair of coincident edges immediately incident to the unknown vertex. In the example depicted in FIG. 6 the search originating at degenerate vertex 603 finds edges 600, 602 and 604, 605 which are non-parallel with each other, and also not parallel with the coincident edges 602, 6003 and 603, 604. Calculating the net angle theta between non-parallel edges 600, 602 and 604, 605, we can calculate the unknown angle of 603 as the difference between theta and the sum of the known angles of the vertices in between them (in this case the known angles of vertices 602 and 604). It should be noted that the polygon boundary also contains other edges, not shown, forming a closed loop.

In some embodiments, a degenerate boundary may include only one vertex. Such boundaries may be handled by the processor being configured to assign the single vertex an exterior angle with magnitude of pi (and sign identical to the known sign of the area of the boundary). Although these values make the sum of the exterior angles of the polygon −pi or pi, rather than the usual −2pi or 2pi, this makes sense as it implies a respective interior angle of zero of 2pi respectively.

Figure 7:
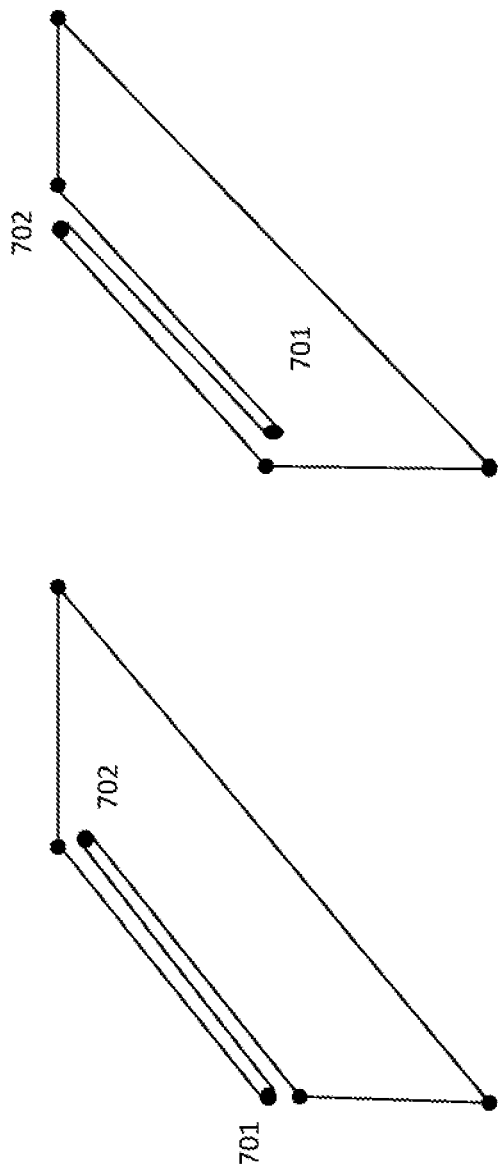
FIG. 7 illustrates determining signs of exterior angles including coincident edges.

Using the described rules set out above, the processor may be configured to determine the sign of most unknown angles. An exception may be boundaries that contain two or more vertices in succession with unknown angles, where at least two have opposite sign, such as in the example of FIG. 7. In the example of FIG. 7, the edge 701, 702 is intended to be coincident with the nearby parallel edges, but the edges are illustrated as being slightly spaced apart to illustrate winding order in the described example. As the angles of 701 and 702 are unknown, there are two possible configurations, each of which are illustrated in FIG. 7, as there are no rules for determining whether the angle 701 is pi and that of 702 −pi, or vice versa. All known angles, and also the sum of angles, are identical in both scenarios.

Although both interpretations are geometrically identical, there is a crucial topological difference in winding order. The winding order dictates which triangles are legal and which are not, which matters when created triangles must mesh with neighbouring ones.

Boundaries with such configurations cannot be handled without a priori knowledge. However, these boundaries generally only occur as result of triangulation during mesh fracturing, and so are not generally present in the input polygon. Accordingly, in these cases we usually know the signs of the angles from history. Therefore, the previously computed values or edge lengths and angles are stored in a memory, so that they can be used to determine angles that occur in child polygons, rather than being re-computed by the processor. This is possible because the geometry of child polygons can be inherited from the corresponding parent polygon. That is, the geometry of the child polygon is in part determined according to the geometry of the parent polygon and the newly constructed triangle.

Geometry inheritance will now be described herein in more detail. When child polygons are created by the insertion of triangles into parent polygons, many of the edges and angles of the children are also present in the parent, either in the outer boundary, or a merged hole boundary. The edge directions and vertex angles of the children could be computed afresh. However, doing so would allow a situation in which directions and angles that were inconsistent between parent and child may be assigned to the child polygons. For example, a zero-length edge may be computed by the processor as having a first arbitrary direction in the parent polygon, and as having a second arbitrary direction, different to the first direction, in the child polygon. Instead, the information already computed for the parent may be inherited for the child polygons. By making use of the geometry already determined for the parent polygon in the determination of the geometry of the child polygon, the computational burden may be reduced and enable consistent edge directions to be assigned during triangulation.

As described above, in some cases, child polygons may contain sequences of adjacent degenerate vertices of exterior angle of either −pi or pi, whose disambiguation requires a priori knowledge. By recording and inheriting the known angles of vertices from parent polygons to the children polygons, contextual information that allows these cases to be resolved may be utilised in the computation of the child polygons.

Child polygons are the parts of the parent triangles left over after creation of a triangle within a parent. All of the edges in a child polygon are present in the parent polygon, save for those edges that are also edges of the embedded triangle. Likewise, all vertices of the child polygon have identical angles in the parent except for those that are vertices of the triangle. For example, referring again to FIG. 1, the edges of polygon 130a created after construction of triangle 120a were all also present in the parent polygon, except for the edge 101a, 105a. Similarly the vertices of child polygon 130a have the same angles as the parent polygon except for vertices 101*a* and 105*a* which have different angles in the child polygon 130*a* after construction of the triangle 120*a*.

Figure 8:
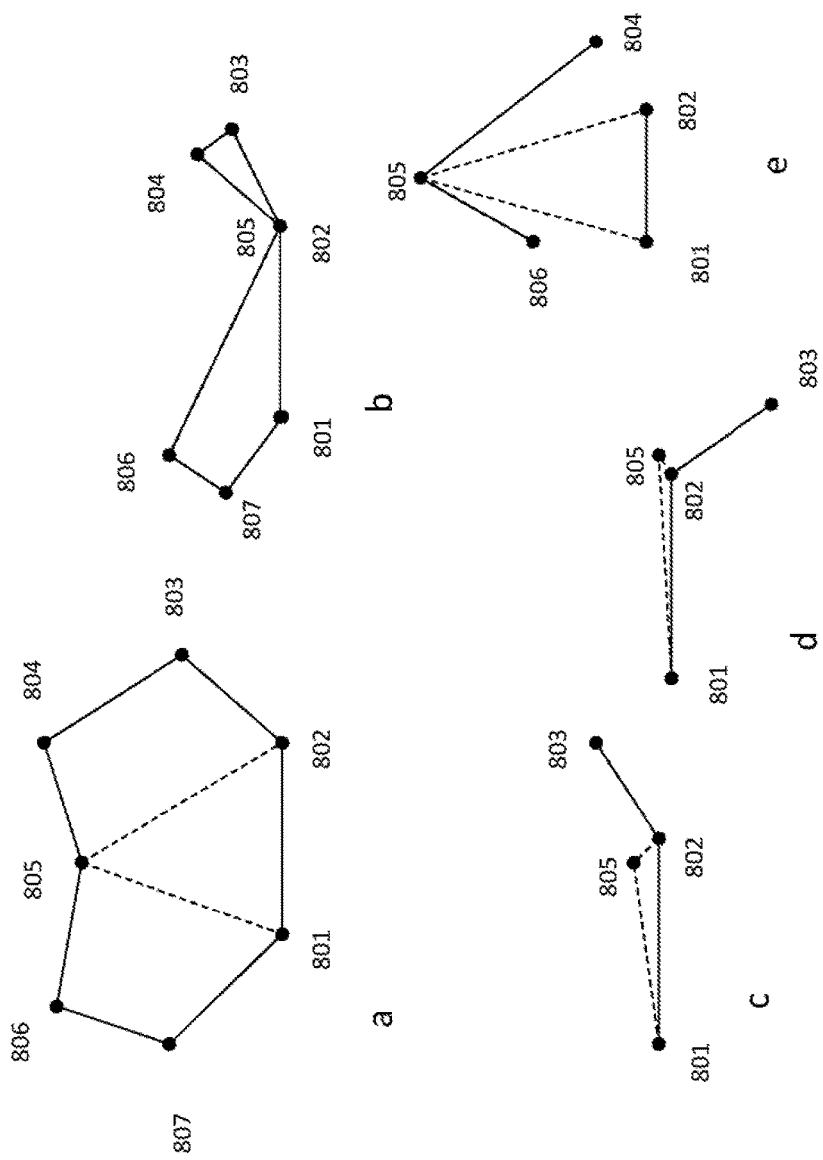
FIG. 8 illustrates using geometry of a parent polygon to determine the geometry of a triangle and child polygon formed during triangulation.

FIG. 8 illustrates an example of how geometry of a parent polygon may be used in a computation by the processor in order to determine the geometry of a child polygon. The geometry of the triangle may be computed in addition to the geometry of the parent polygon as a means to determine the missing geometry of the child polygon. The triangle base edge is also present in the parent so its direction can simply be inherited from the parent polygon. The other two edges are the inward and outward edges incident to the apex vertex. If these edges are of non-zero length (to within tolerance), their directions can be computed directly by the processor. Otherwise, reasonable substitute directions that are consistent with nearby geometry are computed. This is illustrated in FIG. 8. In FIG. 8, some vertices are depicted as being separated to visually aid in understanding, although it will be understood that they may instead represent physically coincident vertices.

Inward and outward edges may be handled in a similar manner. An initial direction that is either identical to, or opposite to, the direction of the base edge may be computed by the processor.

In FIG. 8, diagram a illustrates an example in which a new triangle is constructed from base edge 801, 802 to chosen apex vertex 805. In this example, the vertices are all physically separated, and so determination of the edge directions and vertex angles may be calculated by the processor according to any suitable method.

Diagram b of FIG. 8 illustrates a similar configuration to that of diagram a, however the geometry has now been modified such that vertex 805 is coincident with vertex 802. A new triangle constructed from base edge 801, 802 to chosen vertex 805 is vanishingly small with zero area. In addition, edge 802, 805 has zero length.

As described, the aspects of the present disclosure may be utilised in order to determine the edge directions of the edges of newly constructed triangle 801, 802, 805. As described, the edges in diagram a are all non-zero and so their directions may be computed directly. In diagram b, the edge direction 801, 802 may be computed directly, or may be recalled from memory as it is inherited from the parent polygon. The edge 805, 801 is also non-zero and so the edge direction may be computed directly. However, the edge 802, 805 is zero-length and so has no obvious geometric direction. Nevertheless, since the edge directions of edges matter when triangles are tested and constructed, the edge must be assigned a reasonable direction. Therefore, the present disclosure relates to methods for computing edge directions of zero-length edges.

Since the direction of the base edge 801, 802 is known from the parent, only the two edges leading to the apex vertex 805 need edge directions. In this example only one of the edges is zero-length, but in other examples, both unknown edges may be zero-length. In such a case, both edges would be handled in a similar way. In the present example of diagram b of FIG. 8, the process of determining a direction for a zero-length edge is illustrated for the edge 802, 805.

An initial direction for 802, 805 may be determined first. To do this, the known direction of the base edge 801, 802 may be utilised, or alternatively its opposite (negated) direction may be used. Diagram c and d illustrate how the choice between the base edge direction or the negated direction is made. In these two diagrams, the length of 802, 805 is exaggerated for illustrative purposes only, by showing vertex 805 as being a distance from the base edge, when in reality it is coincident with vertex 802.

The choice of the initial direction of 802, 805 depends on the orientation of the adjacent edge in the boundary, in this case, edge 802, 803. If vertex 802 in the parent polygon is convex or straight (diagram c), then edge 802, 805 is assigned the negated direction of preceding base edge 801, 802. Otherwise, if vertex 802 is concave (diagram d), them edge 802, 805 is assigned the direction of preceding base edge 801, 802. The effect is to orient edge 802, 805 such that it faces "toward" vertex 803, ready to form a later triangle with it.

The edge direction of 802, 805 may need to be further adjusted after the initial computation of the edge direction. For example, while the initial direction is determined in order to match the geometry around the base edge, this may contradict the geometry of the edges already incident to the apex vertex (vertex 805). Therefore, the angles made by the two incident polygon edges 804, 805 and 805, 806 at vertex 805 are inspected, and an angle of the proposed initial direction for edge 802, 805 may be measured. If the initial direction at vertex 805 lies outside the range bounded by the two polygon edges 804, 805 and 805, 806, then the direction is clamped to that range, effectively just replacing it with the direction of whichever boundary edge it lies beyond (negated as needed). Therefore, in the case of edge 802, 805, the initial determined direction is replaced with the direction of 804, 805 if it lies beyond that edge, or the negated direction of edge 805, 806, if it lies beyond that edge. The reason for negating the direction of edge 805, 806 is because the direction must be towards vertex 805 rather than a direction away from it. It will be recognised that at least one of the edges illustrated in diagram e is intended to be of zero-length, but the vertices are shown as separated here.

Therefore, the edge directions and vertex angles of a parent polygon may be utilised in order to determine the edge directions and vertex angles of a child polygon formed as a result of triangulation.

Considering the exterior angles of the triangle vertices, in general, none can be inherited directly from the parent, unless the defined triangle happens to contain two, rather than one, edge that is also in the parent polygon. However, they can be computed from the calculated directions of the triangle edges as described. Any ambiguous exterior angles can be assumed to have positive sign (i.e. +pi) since the vertices of positive triangles are always convex.

Once the geometry of the triangle has been computed, it can be used to compute the missing geometry of the child polygons. The missing edge directions of the child polygons are just the opposites of the directions of the corresponding triangle edges. Furthermore, the missing angles at the base edge vertices may be computed by noting that their interior angles in the child polygons are the differences between their interior angles in the parent outer boundary and their corresponding interior angles in the triangle. The processor can then compute exterior angles from interior angles by subtracting them from pi, and vice versa.

Once these directions and angles have been transferred from the parent polygon to the child polygon, the only geometry missing from the child polygons are the respective exterior angles of the child polygon vertex that is also the triangle apex vertex. These angles can either be computed directly, or else inferred due to being the only unknown angles and the fact that the child polygons are known to be positive.

The method described in the present disclosure for handling degeneracies may be used, for example, in the context of triangulation. In some examples, triangulation may be performed according to Delaunay criterion. However, any suitable method of triangulation may be used.

Figure 9:
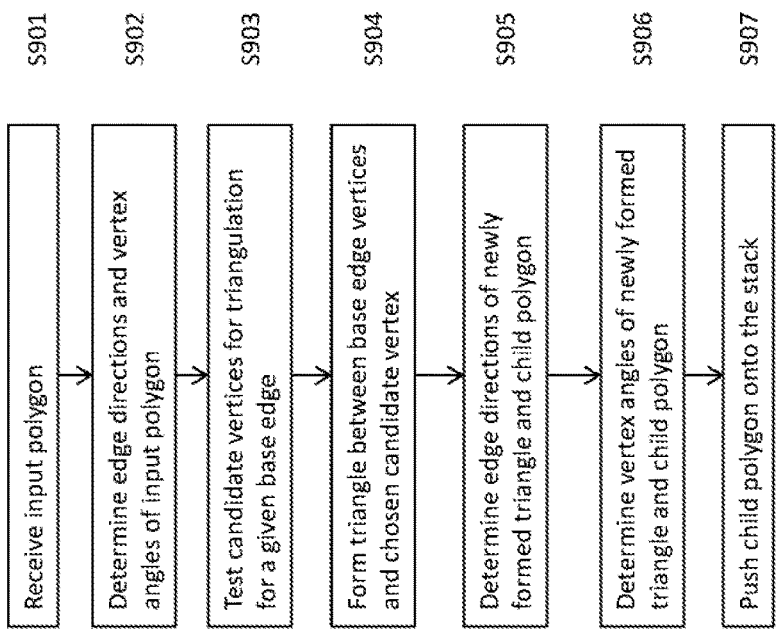
FIG. 9 is a flow diagram illustrating a method of mesh simplification.

FIG. 9 is a flow chart illustrating steps of a method that may be performed by a processor in accordance with embodiments of the invention, in the context of performing triangulation. It will be recognised that not all of the steps need necessarily be performed, or additional steps to those described may also be performed. In addition, it will be recognised that the steps may be carried out in a different order to those set out in FIG. 9.

In step S901, an input polygon is received. That is, an input polygon may be popped off a stack. The input polygon may be any polygon. For example, the polygon may be a simple polygon with a single boundary. In other examples, the polygon may be a complex polygon with multiple boundaries. After performing steps S902 to S907, this step may be repeated, where the input polygon may be a child polygon pushed onto the stack at step S907.

In step S902, the edge directions and vertex angles of the boundary/boundaries of the input polygon are determined. The edge directions and vertex angles are determined in accordance with the above description with reference to FIGS. 1 to 8. By determining the edge directions and vertex angles in accordance with the method described herein, the present disclosure provides a method for handling polygons which include degeneracies. Otherwise, conventional methods of triangulation aim to directly compute the edge directions and vertex angles which may be particularly difficult, if not impossible, for such polygons.

The determined edge directions and vertex angles may be recorded and stored in a memory, to be used throughout the triangulation process. Therefore the step of determining edge directions and vertex angles of the input polygon may comprise receiving edge directions and vertex angles of the input polygon which have been previously recorded and stored. Any unknown edge directions and vertex angles are then computed either directly, or in accordance with the above description of assigning edge directions for edges having a length below a given tolerance, or assigned vertex angles to vertices having an exterior angle of magnitude pi, to within a given small tolerance.

In step S903, candidate vertices may be tested for triangulation. A candidate vertex is a vertex which may be joined to two other vertices of the polygon to form a triangle within the polygon. A candidate vertex is tested relative to vertices of the polygon which are joined together by a single edge, which may also be referred to herein as a "base edge". By forming a triangle from a base edge to a candidate vertex, the input polygon may be split into a triangle and up to two child polygons. The candidate vertex chosen for triangulation may be selected based at least in part on the Delaunay criterion which the skilled person will be familiar with, or according to any suitable triangulation criterion. In addition, the candidate vertex chosen may be selected based on a number of other considerations, such as vertex visibility, and the boundaries of the polygon. The relevant considerations to take into account will be apparent to the skilled person when selecting a candidate vertex for triangulation.

In step S904, the method comprises forming a triangle between the base edge vertices and the chosen candidate vertex. In this step, the triangle is formed by joining together the vertices of a selected base edge with the candidate vertex selected in step S903 by edges.

In step S905, the polygon edge directions of the newly formed triangle and child polygons are determined. For edges of a length below a given tolerance, the edge is be assigned a length of zero, as described above. The edge direction assigned to any zero-length edges may be determined based on the edge directions of the parent polygon and/or the immediately surrounding edge directions, in accordance with the description set out above in relation to FIGS. 1 to 8.

In step S906, the angles of vertices of the newly formed triangle and child polygon are determined. For exterior angles close to −pi or pi to within a given tolerance, the vertex may be assigned an angle based on a number of conditions, as described above in relation to FIGS. 1 to 8. As described above, in some examples, the angle may be −pi or pi. The angle assigned may depend on the angles of surrounding vertices in the boundary.

In step S907, the child polygons formed as a result of the triangulation are pushed onto the stack.

Steps S901 to S907 may be performed recursively as part of a triangulation operation until each vertex and edge of the original input polygon is used to form part of a triangle.

Steps S903 and S904 relate to performing triangulation within a boundary, that is, performing constrained triangulation. In the method described above, at step S90, the input polygon provides the boundary or boundaries in which to perform constrained triangulation. Constrained triangulation of polygons requires active rejection of candidates whose triangles lie partly or entirely outside the polygon.

As described, the methods for dealing with degenerate vertices and zero-length edges may be applied in triangulation. When performing constrained triangulation, that is triangulation within a polygon boundary, candidate vertices for triangulation may be tested for suitability using triangle collision and vertex visibility testing. Vertex visibility testing, which is described in more detail below, is improved by robust computation of winding angles. Winding angles are the angles traced by sequences of edges in polygon boundaries around fixed points such as polygon vertices. Winding angles use the concept of polygon winding order, by which the vertices and edges of a polygon form an ordered sequence that 'winds' around the polygon. The usefulness of winding angles lies in that they incorporate the winding order of the polygon to order pairs of vertices by how they are wound with respect to one another, which is not always clear from their relative positions alone.

Winding angles are typically traced in the positive winding order of the polygon (typically counter-clockwise for positive polygons, although conventions vary), but may also be traced in reverse, or negative, winding order. Note that winding angles are measured with respect to fixed points and are not the same as the exterior vertex angles of the polygon vertices.

Because winding angles are useful in the testing of mutual visibility of vertices within polygon boundaries, they may be incorporated into constrained triangulation methods that must respect the polygon boundaries. Robust computation of winding angles in the presence of degenerate geometry is therefore of importance to robust determination of vertex visibility and hence to robust triangulation. In some embodiments winding angles may be used in the direct determination of the visibility of candidate vertices from the vertices of triangle base edges, as described below.

Figure 10:
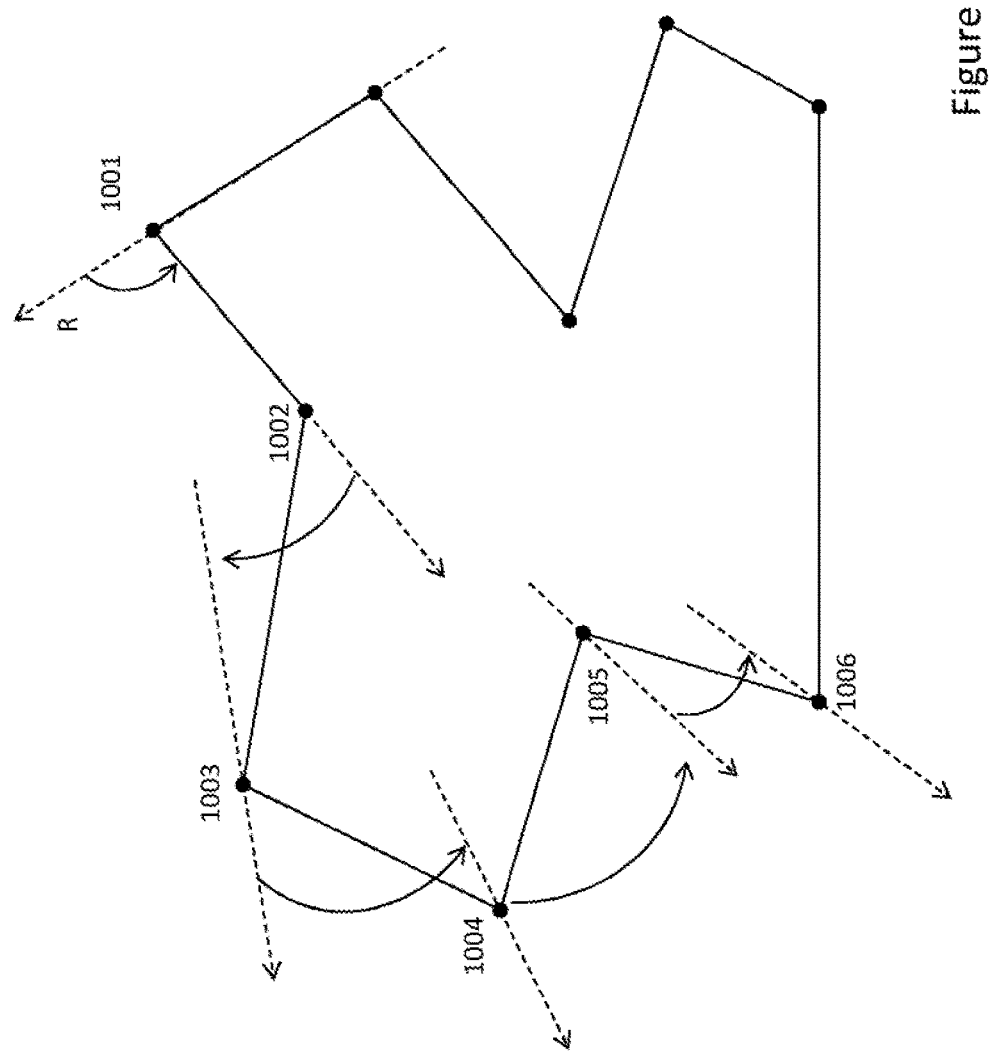
FIG. 10 illustrates computation of winding angles of polygon vertices.

The winding angle of a polygon vertex may be calculated around a reference vertex with respect to a given reference direction. For example, FIG. 10 shows the calculation of the winding angle of vertex 1006 around vertex 1001, with respect to a reference direction R. The reference direction in this case also happens to be the direction of the incoming edge. The winding angle of vertex 1006 measures the net total angle wound around vertex 1001 by the polygon edges traced between the two vertices. Accordingly, the winding angle is the sum of a series of signed angles. While in this case, the winding angle is computed in positive polygon winding order (i.e. counter-clockwise), it is also possible to compute winding angles in the opposite (negative) winding order where appropriate, by tracing polygon edges clockwise instead.

The winding angle of a given polygon vertex is computed with respect to a reference vertex, around which the given polygon vertex is wound. An arbitrary reference direction may also be established. Given a reference vertex and a reference direction, the first angle in the sum of angles making up the winding angle is just the signed angle of the first followed edge, relative to the reference direction. In the example of FIG. 10 therefore, the first angle in the sum of angles is the angle of edge 1001, 1002 relative to direction R. The second and subsequent angles are then the signed angles between pairs of directions, where the directions in each pair are the directions from the reference vertex to each of the vertices of a polygon edge. The directions in each pair, in the example of FIG. 10, are the directions from reference vertex 1001 to vertices 1002 and 1003, respectively, and so on. In the case of the third and subsequent terms, the first direction in each pair is the second direction from the preceding pair.

Although the above description relates to angles, winding angles may be computed implicitly rather than by directly computing the actual angles, as computation of angles may require trigonometry which may be expensive in terms of computing resources. In the examples described, the computation of the actual angles are referred to because this allows degenerate cases to be explicitly detected and handled. It will be recognised however, that it may be possible to perform the methods described herein without requiring direct calculation of angles.

The calculation of winding angles is trivial when all edges have non-zero length, all angles formed are unambiguous, and no two vertices are coincident. However, calculation of angles between directions breaks down when the directions are opposite (so that the angle between them is either –pi or pi). Additionally, calculation of the directions of vertices from a reference vertex breaks down when the vertices in question are coincident with the reference vertex. We handle these cases using steps described in more detail below.

When a vertex is coincident with the reference vertex, to within a given tolerance, a feasible direction between the vertices is established, since no geometrically valid direction is available. In the case of the first vertex encountered in the example of FIG. 10, that is vertex 1002, the direction to that vertex from the reference vertex is known since it is identical (or opposite, depending on the context) to the known direction of the edge between them. For other, subsequent vertices, the direction to the vertex is assumed to be identical to the direction of the incoming polygon edge. For example, if vertex 1005 were coincident with reference vertex 1001 in the example of Figure to, then the known direction of the inward edge 1004, 1005, would be used as the direction from 1001 to 1005.

Figure 11:
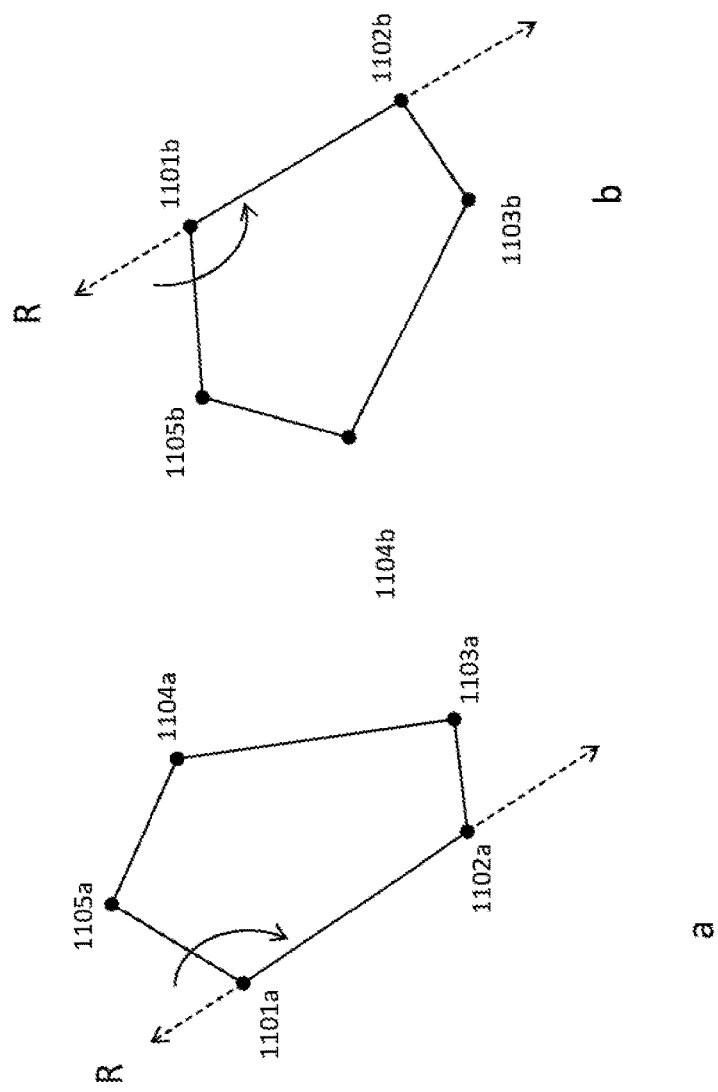
FIG. 11 illustrates computation of winding angles of polygon vertices.

When the pair of directions in the first angle term (i.e. the reference direction and the direction of the first edge) are opposite, the processor is not able to determine from the pair of directions alone whether the angle between them is –pi or pi. The difference is topological and amounts to whether the second direction is wound counter-clockwise or clockwise with respect to the first. This may be resolved by assigning an angle of pi (i.e. positive) if the winding angle is being computed in negative (clockwise) winding order, and –pi if the winding angle is computed in positive (counter-clockwise) winding order). This is illustrated in the example of FIG. 11, where the angle between the reference direction R and the first edge 1101*a*, 1102*a* from reference vertex 1101*a* is treated as –pi in diagram a, where the winding angle is computed in counter-clockwise winding order. In diagram b, the angle between reference direction R and the first edge 1101*b*, 1102*b* is treated as pi, where the winding angle is computed in clockwise winding order.

Finally, when the pair of directions in a second or subsequent angle term (i.e. the directions from the reference vertex to two successive polygon vertices) are opposite, or coincident to within a small tolerance, the directions alone cannot be used to determine whether the second vertex is wound clockwise or counter-clockwise around the reference vertex, with respect to the first. This case is handled by tracking a separate sum of angles, in parallel, and basing the sign of such unknown angles on the current sign of that sum when the unknown angle is encountered. The separately tracked sum of angles is simply the sum of the exterior angles of the vertices encountered so far (negated, if the winding order is negative), plus the signed angle of the first vertex relative to the reference direction R. If the tracked angle sum is positive, then the processor is configured to treat the unknown angle as positive, and vice versa. The tracking of a separate sum of angles is illustrated in FIG. 12

Figure 12:
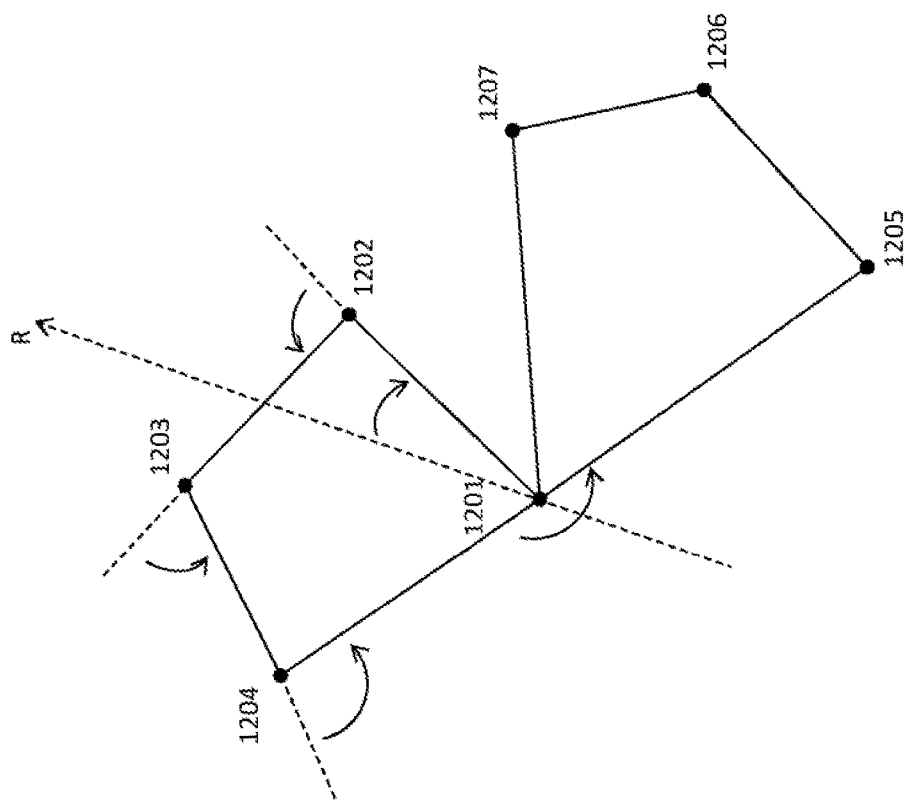
FIG. 12 illustrates computation of winding angles of polygon vertices.

In FIG. 12, the directions from the reference vertex 1201 to successive polygon vertices 1204 and 1205 are opposite, because vertex 12001 lies exactly on the edge 1204, 1205 between them. For that reason, a processor is ordinarily unable to determine from the directions alone whether the angle between them is –pi or pi. Similarly, a processor would ordinarily be unable to determine which side of vertex 1201 the edge 12004, 1205 has passed, topologically. Therefore, according to the present disclosure, the processor is configured to track a separate sum of angles consisting of the signed angle of the first edge 1201, 1202 relative to the reference direction R, plus the signed exterior angles of the vertices encountered so far (in the present example, 1202, 1203 and 1204). The processor is configured to negate the vertex exterior angle terms in the sum if the polygon edges are being tracked in negative (clockwise) winding order.

The present disclosure therefore provides methods of robustly determining winding angles. These methods may be implemented in determining vertex visibility, for example, which may be used in a constrained triangulation process. However, it will be recognised that determining winding angles in accordance with the present disclosure may be used in any suitable application which requires the winding angles to be determined.

Vertex visibility may be tested during triangulation processes, particularly in constrained triangulation. For example, vertex visibility determination may be utilised when testing candidate vertices for triangulation. That is, vertices may be tested to determine whether a given vertex is visible from a given base edge. A vertex is visible from a base edge if the vertices of the base edge can be connected with the given vertex without crossing another edge or extending beyond the boundary of the polygon. Visibility testing of vertices may be performed according to any suitable method, which may be known to the skilled person. However, vertex visibility testing may be difficult in some circumstances.

Robust calculation of winding angles within degenerate polygons with zero-length edges and exterior angles of –pi or pi provides for mutual visibility of vertices to be robustly determined. This may be used for constraining triangles to polygon boundaries in triangulation.

Figure 13:
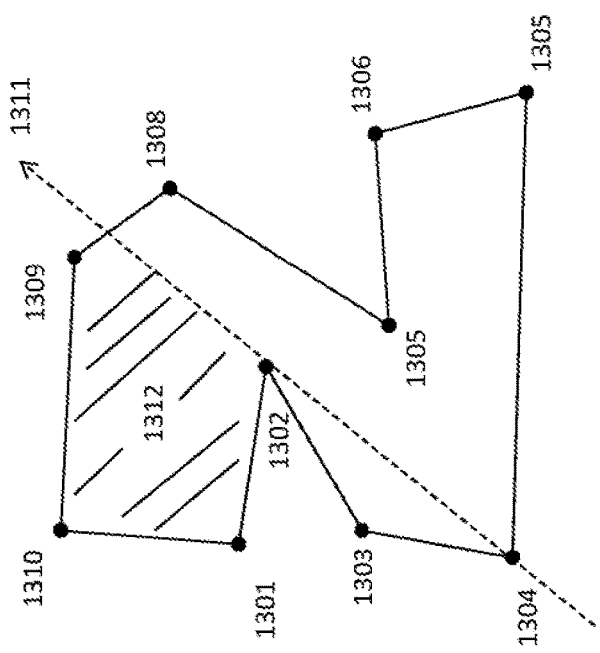
FIG. 13 illustrates determining vertex visibility within polygons.

FIG. 13 illustrates an example of determination of vertex visibility within polygons. Embodiments of the present disclosure relate to robustly determining whether one vertex of a polygon is visible from the point of view of another, or whether it is obscured by the polygon boundary. The processor may, for example, be configured to determine whether a target vertex is located in a "shadow region" which is bounded by a vertex that is silhouette when viewed from a viewpoint vertex. Shadow regions and silhouette vertices are described in more detail below with reference to FIG. 13

In the example of FIG. 13 the processor determines that vertex 13009 is not visible from a viewpoint vertex 1304, while vertex 1308 is visible from viewpoint vertex 1304. The reason is because vertex 1309 is located in a shadow region 1312 of vertex 1302, from the viewpoint of 1304. Vertex 1302 can be considered to be a "silhouette vertex" because it lies on the silhouette of the set of edges that cast the shadow, and so delimits the shadow region 1312.

To determine whether a target vertex is visible from a viewpoint vertex, the processor is configured to identify all shadow regions and check whether the target vertex lies within each one. If the target vertex is not located within any shadow regions, the processor is configured to determine that the target vertex is visible from the viewpoint vertex. Since shadow regions are delimited by silhouette vertices, the processor is configured to determine whether each vertex (aside from the viewpoint and target vertices) is a silhouette vertex.

Silhouette vertices are characterised in that one of their incident edges faces toward the viewpoint vertex, while the other faces away. In the example of FIG. 13, edge 1302, 1303 faces toward viewpoint vertex 1304, while edge 1301, 1302 faces away. The shadow region bounded by the silhouette vertex is incident to the edge that faces away. The shadow region can therefore be described as lying in the positive or negative winding direction from the silhouette vertex. Silhouette vertices are always concave, and represent points of concavity within the polygon boundary where it intrudes enough to cast a shadow. However, it will be recognised that not all concave vertices are silhouette.

Each concave vertex (aside from the viewpoint and target vertices) is a candidate silhouette vertex. For a given candidate vertex, the processor is configured to compute the view direction to that vertex from the viewpoint vertex. In the example of FIG. 13, the view direction from vertex 1304 to vertex 1302 is indicated by an arrow 1311. With the view direction determined, the processor is configured to compute the angle of each of the edges incident to the candidate vertex relative to the view direction, as shown in more detail in FIG. 14. The candidate vertex is silhouette if both of the incident edges lie on the same side of the view direction line.

Figure 14:
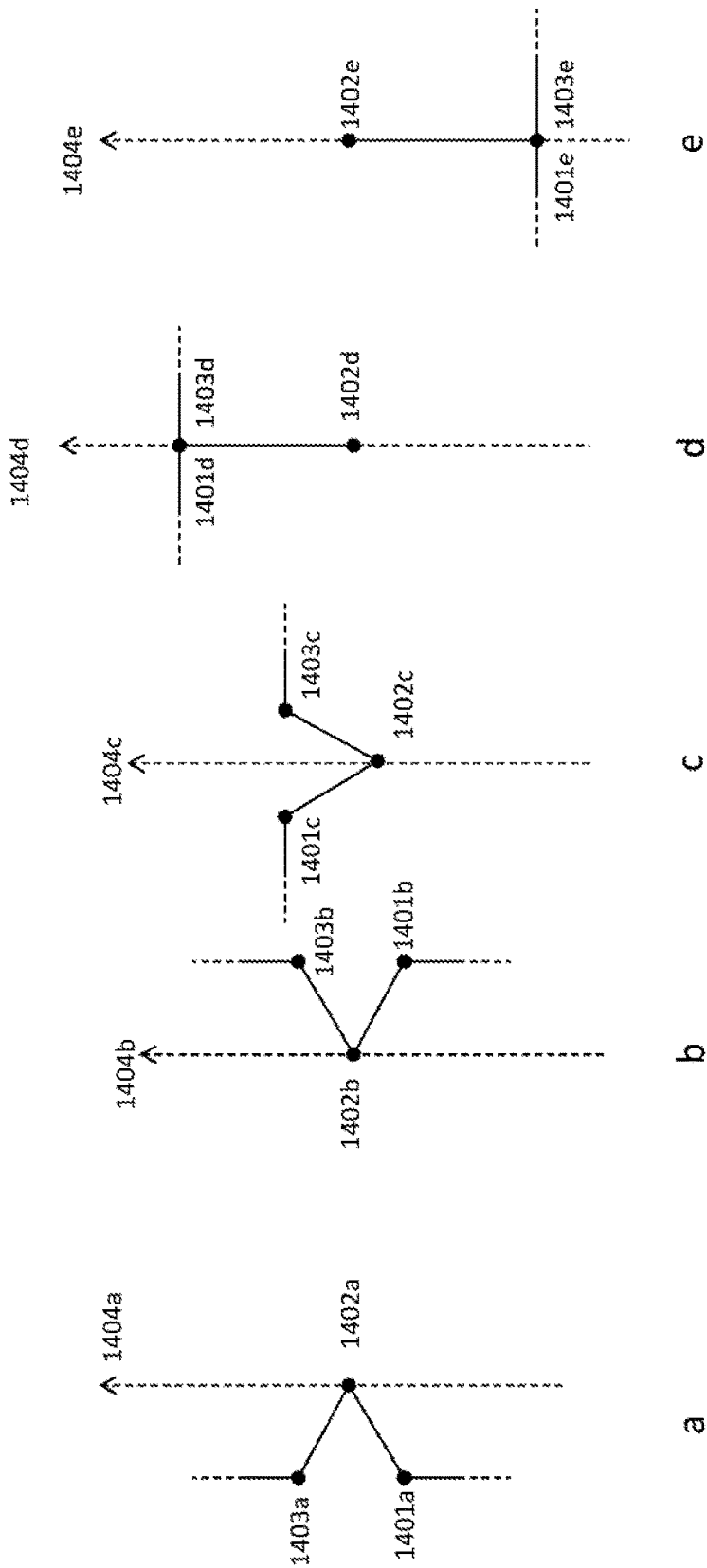
FIG. 14 illustrates determining vertex visibility.

The processor is configured to calculate the signed angle of each of the two incident edges with respect to the view direction. In the example of FIG. 14, the processor is configured to determine the direction from candidate vertex 1402 (*a-e*) to adjacent vertices 1401 (*a-e*) and 1403 (*a-e*), and to calculate the angles of those directions with respect to the view direction 1404 (*a-e*).

If both angles are positive, as shown in the example of diagram a, then the candidate vertex is silhouette and potentially delimits a shadow region on the side of the edge with smaller absolute angle.

Similarly, if both angles are negative, as shown in the example of diagram b, then the candidate vertex is silhouette and potentially delimits a shadow region on the side of the edge with smaller absolute angle.

However, if one angle is positive and the other negative, as shown in the example of diagram c, then the vertex is not silhouette, since its incident edges either both face toward or both face away from the viewpoint vertex.

More difficult cases may arise when both angles are either zero, as shown in diagram d, or have magnitude pi, as shown in diagram e. In the example of diagram d, the directions to vertices 1401 and 1403 both make angles of zero with the viewing direction, implying that vertex 1402 is maximally concave but viewed head on, and so casts no significant shadow to either side.

Finally, in the case of diagram e, the directions to vertices 1401 and 1403 are both opposite to the viewing direction, so make angles of −pi and pi. In this case, vertex 1402 is maximally concave but viewed from a viewpoint vertex located in the direction of its incident edges, so casts a shadow to one side or the other, depending on which side of those edges the viewpoint is located.

Figure 15:
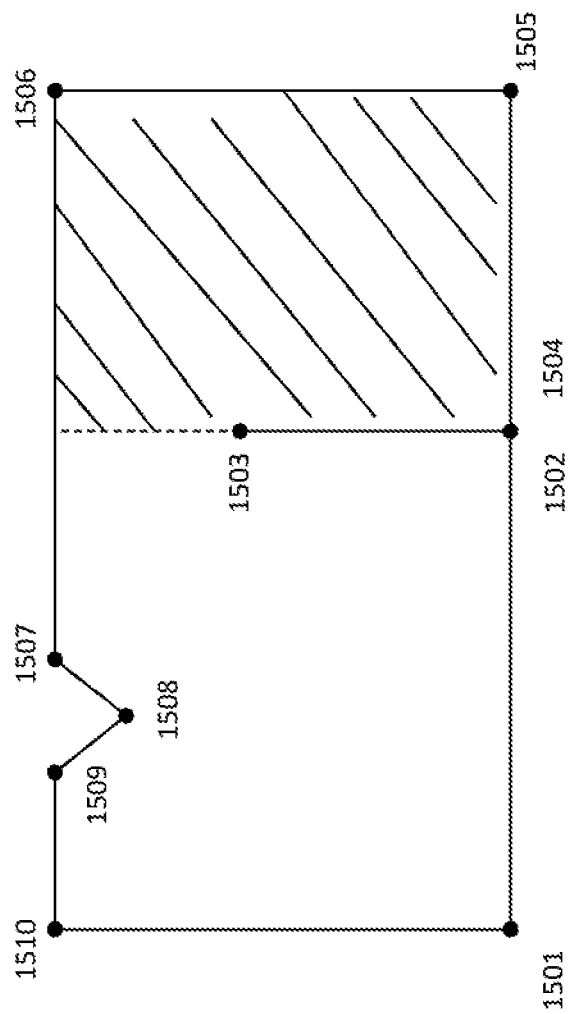
FIG. 15 illustrates a silhouette vertex casting a shadow.

This is illustrated in more detail in the example of FIG. 15, where maximally concave vertex 1503 is silhouette with respect to vertex 1502, casting a shadow to the right hand side. This implies that vertex 1508, for example, is visible from vertex 1502 but not from vertex 1504, even though vertices 1502 and 1504 are coincident. If the viewpoint vertex were vertex 1504 rather than vertex 1502, then the situation would be reversed and the shadow region would be on the left.

The processor may be configured to determine on which side of the pair of coincident edges incident to the candidate vertex the viewpoint vertex lies by calculating the winding angle of the viewpoint vertex around the candidate vertex with respect to the (negated) view direction, in forward and reverse polygon winding order. In the example of FIG. 15, the processor is configured to determine the winding angle of viewpoint vertex 1502 around candidate vertex 1503, relative to the direction from 1503 to vertices 1502 and 1504, following the polygon edges from vertex 1503 to vertex 1502 in positive (counter-clockwise) and negative (clockwise) winding orders. One of the winding angles will typically be zero and the other either −2pi or 2pi, having wound around the polygon once. The processor is configured to determine that the viewpoint vertex lies on the side with winding angle of zero. In the example of FIG. 15, the winding angle of vertex 1502 with respect to the negated view direction (i.e. from 1503 to 1502) is zero when following edges in clockwise winding order from 1503, and 2pi when following edges in counter-clockwise winding order from 1503. The processor is configured to determine that vertex 1502 lies on the clockwise winding order side of vertex 1503, and the shadow region delimited by vertex 1503 is incident to edge 1503, 1504.

Figure 16:
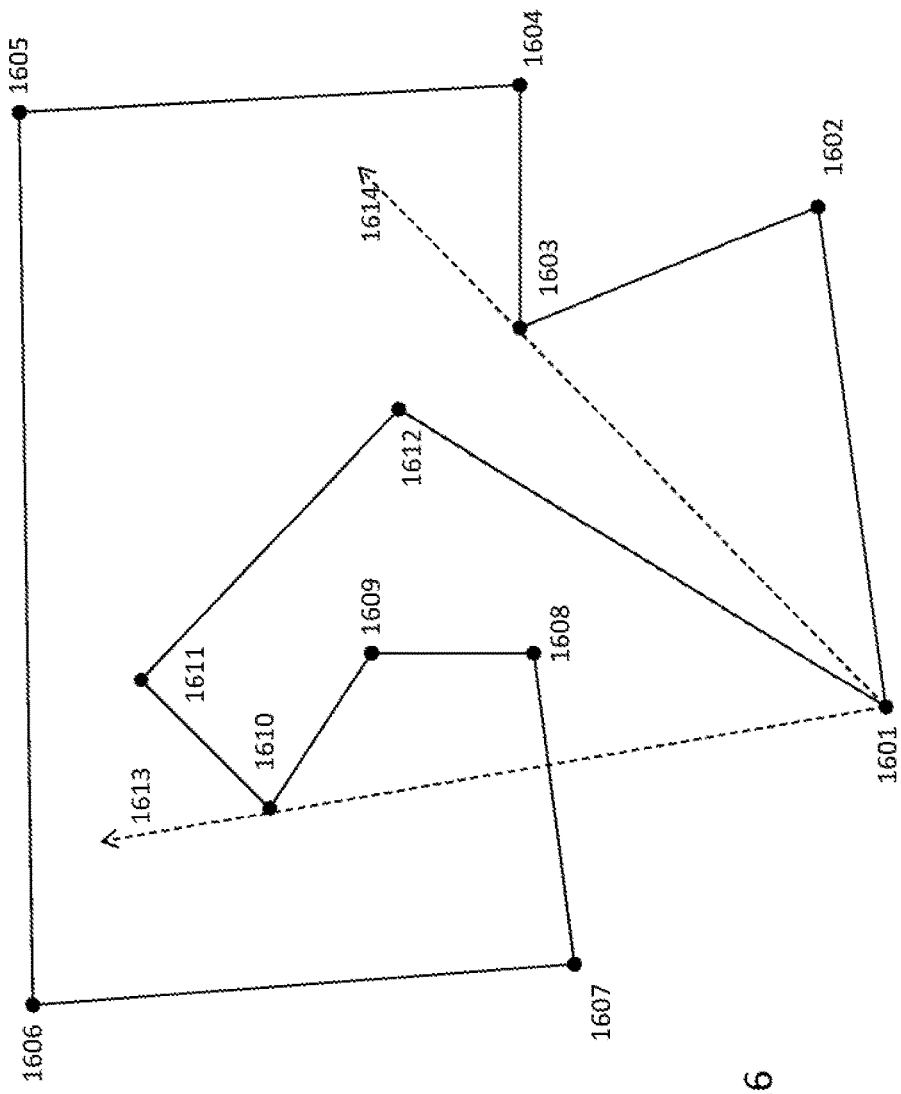
FIG. 16 illustrates determining vertex visibility.

In some examples, such as that shown in FIG. 16, vertices that are silhouette with respect to the viewpoint vertex still do not cast a significant shadow due to themselves being hidden around a series of corners. In the example of FIG. 16, vertex 1610 is silhouette with respect to the view direction 1613 from viewpoint vertex 1601, yet casts no shadow because it is obscured from viewpoint vertex 1601 by the polygon boundary. In contrast, vertex 1603 has incident edges of similar orientation relative to its view direction 1614, and does cast a shadow.

Such obscured silhouette vertices must be detected and eliminated to prevent them causing some vertices to be incorrectly identified as in shadow. Given a vertex identified as silhouette, the processor is configured to detect whether it is obscured around a series of corners by computing the winding angle of the viewpoint vertex around it relative to the negated view direction, in the winding direction that leads from the silhouette vertex on the side of its non-shadow region. If the calculated winding angle is non-zero then the processor is configured to determine that the viewpoint vertex is wound around the silhouette vertex, and so is obscured from it. In the example of FIG. 16, the series of edges that lead to viewpoint 1601 from silhouette vertex 1610 on the non-shadow side of vertex 1610, visit vertices 1609, 1608, 1607, 1606, 1605, 1604, 1603, 1602, and 1601. These are wound once around vertex 1610.

Once a given candidate vertex has been identified as silhouette and shown not to be hidden by a series of corners, the processor is configured to check whether the target vertex is located in the shadow region it delimits. To do this, the processor is configured to compute the winding angle of the target vertex around the silhouette vertex, relative to the view direction from the viewpoint vertex to the silhouette vertex, in the winding angle direction on the shadow side of the silhouette vertex. If the shadow is on the positive winding direction side of the silhouette vertex and the computed winding angle of the target vertex is negative, the processor is configured to determine that the target vertex is in shadow and so not visible from the viewpoint vertex. Similarly, if the shadow is on the negative winding direction side of the silhouette vertex and the computed winding angle of the target vertex is positive, the processor is configured to determine that the target vertex is in shadow and so not visible from the viewpoint vertex. Otherwise, the target vertex is not in the shadow region so may be visible if it is not also in the shadow region of any other silhouette vertices.

Figure 17:
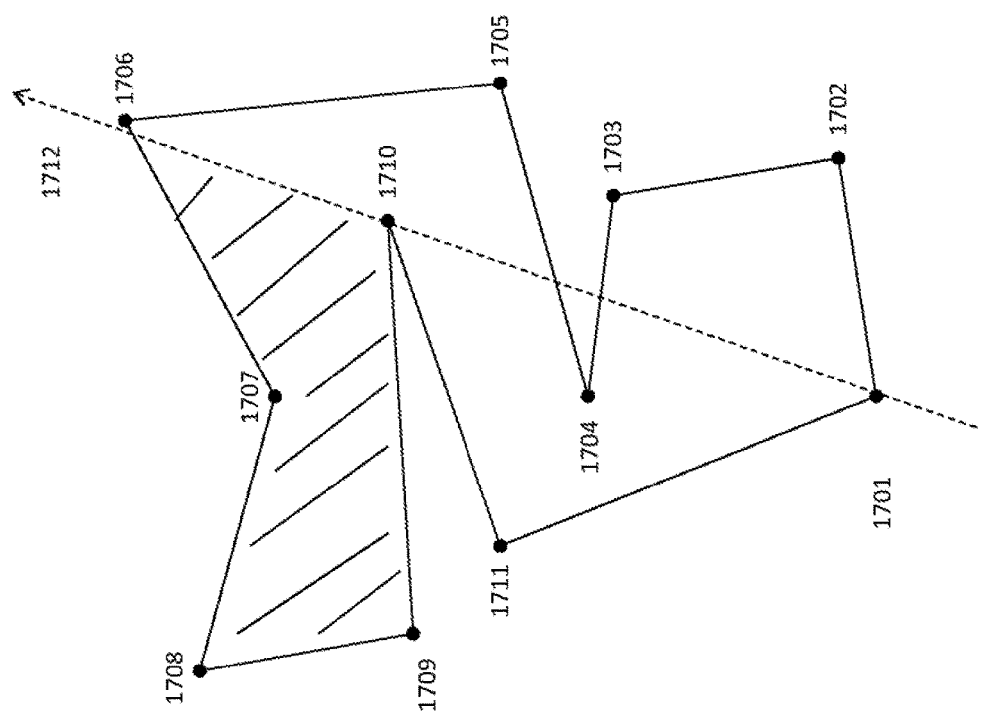
FIG. 17 illustrates determining vertex visibility.

In the example illustrated in FIG. 17, the shadow region delimited by silhouette vertex 1710 is on its clockwise (negative) winding order side. Vertex 1708 has positive (counter-clockwise) winding angle around vertex 1710, relative to viewing direction 1712, so is in the shadow region of vertex 1710. Vertex 1706, on the other hand, has negative winding angle around vertex 1710 with respect to the viewing direction, so is not in the shadow region. The usefulness of winding angles is made clear by considering vertex 1704, which is not in the shadow region even though it lies on the same side of the viewing line 1712 as vertex 1708, which is in the shadow region. It is because vertex 1704 is wound around vertex 1710 past the viewing direction that places it out of shadow.

Robust computation of edge directions and vertex angles allows for degenerate polygons to be processed. This may be used together with robust computation of winding angles and robust visibility testing as described in order to provide a robust method of triangulation which may be used, for example, in generation of meshes using CSG.

There will now be described an application of the above described methods in relation to constrained triangulation, which may be improved by the use of the robust handling of degenerate polygons.

Using conventional methods, constrained triangulation may pose a particular difficulty in the case of meshes generated using CSG, where the resulting polygons may be complex polygons which include more than one boundary, such as in the example of FIG. 1*b*, which includes an outer boundary and hole boundaries. In addition, some of the edges of the boundaries may be degenerate with ambiguous directions, and some of the boundary vertices may be degenerate with ambiguous angles, which may be difficult to handle using conventional triangulation methods.

Constrained triangulation requires robust rejection of candidate triangles that are not conformed to the boundaries of the polygon. For example, where a mesh has been clipped during CSG mesh generation, the candidate triangle must not extend beyond the boundary of the triangulated face after clipping. Otherwise, the resultant meshes may not be valid and the triangulation may fail.

In general, triangles which do not conform to the polygon boundaries may be rejected by performing collision testing of candidate triangles against triangulations of the polygon's concavities. In other examples, rejection of such triangles may be performed by the processor by direct testing of the visibility of candidate vertices from triangle base edges. Visibility testing may be robust at dealing with degenerate input when these are processed in accordance with the methods described above In collision testing of candidate triangles, any concavities are treated as obstacles that the candidate triangles must not significantly overlap in order to be considered.

An outer boundary of a polygon includes concavities wherever it is non-convex. These concavities may be extracted by building the 2D convex hull of the boundary and then determining the edges that are not in the hull.

In addition to concavities in the outer boundary, complex polygons may also have hole boundaries. Hole boundaries are read as concavity polygons, as they do not form part of the convex hull of the polygon. The winding order of the hole boundaries is reversed compared to outer boundaries, as the hole boundaries represent holes and so have negative area.

The concavities which are extracted are simple polygons with one boundary, but these simple polygons may be concave themselves. Therefore, each extracted concavity is recursively triangulated using general triangulation. The recursion will terminate because, although the concavities may contain further concavities, those concavities are guaranteed to be smaller than themselves.

Degenerate one and two vertex holes, which may represent embedded vertices and edges, are extracted by the processor as degenerate one and two vertex concavities. Instead of discarding such vertices during triangulation, the processor is configured to retain these degenerate polygons as degenerate one and two vertex triangles.

Collision testing is a computational operation that may be performed by the processor with simple triangle-triangle collision tests based on the Separating Axis Theorem. The "best separation direction" between a pair of triangles and the resultant "best separation" between them along the axis are determined. If the measured separation is negative (i.e. below the negated distance tolerance) then the processer determines that the triangles are colliding, and thus rejects the corresponding triangle. Any degenerate one- and two-vertex triangles are also collision tested. Degenerate one and two vertex triangles may be collision tested using specialised triangle-point and triangle-line versions of the collision tests performed by the processor.

Collision testing may be sufficient to reject most "illegal" candidate triangles, i.e. triangles which extend beyond a boundary of the input polygon. However, collision testing may fail in the case that a polygon boundary visits the same point twice, as shown for example in FIG. 18, where the boundary visits the same point at vertices 1805 and 1809. In some embodiments, although collision testing for significantly self-intersecting polygons may be difficult to support, polygons with boundaries that meet do occur commonly. Therefore, the processor is configured to support collision in polygons with boundaries that meet.

Figure 18:
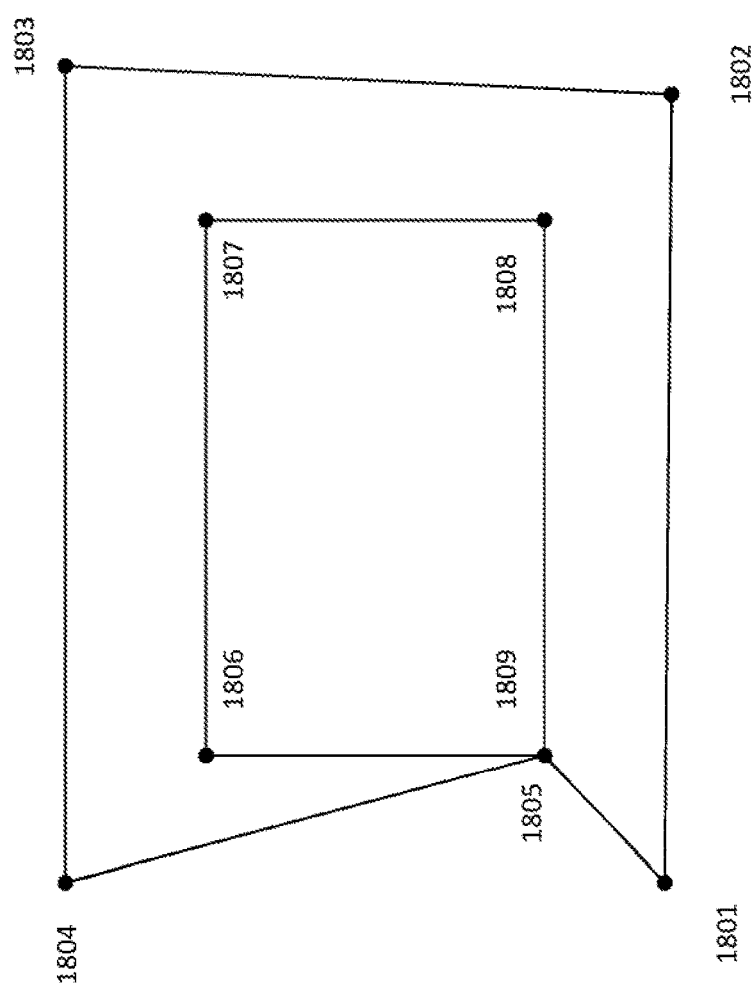
FIG. 18 illustrates determining vertex visibility.

Such polygons with boundaries that visit the same point twice may be introduced during triangulation, for example, when a hole boundary is merged into the outer boundary by the creation of a triangle spanning from a base edge in the outer boundary to the vertex of a hole. In the example of FIG. 18, the boundary is degenerate and visits the same point twice at coincident vertices 1805 and 1809. Such a configuration may have been left over, for example, after the creation of an earlier triangle 1804, 1801, 1805.

At such multiply referenced vertices, the adjacent concavities narrow to zero width. As a result, conventional collision testing of such points is not sufficient to prevent vertices in an obscured part of the boundary from being classified as visible from a given edge.

In the example illustrated in FIG. 18, vertex 1809 is visible from base edge 1801, 1802, but vertex 1805 is not visible from base edge 1801, 1802. Therefore, vertex 1805 is not a legal candidate for triangulation. However, conventional methods such as collision testing may cause 1805 to be incorrectly counted as visible as the concavities adjacent to it don't serve to hide it significantly from base edge 1801, 1802.

In order to address such blind spots, a processor may be configured to test the visibility of the candidate vertex from the base edge with respect to the boundary directly. In this case, the processor is configured to reject a candidate triangle if the corresponding candidate third vertex is obscured by the boundary from the point of view of either vertex of the base edge.

In the embodiment described, the use of direct visibility testing is limited to candidate vertices in the outer boundary, since the direct visibility test only handles simple one-boundary polygons. Occlusion of such vertices by a hole boundary may instead be handled by collision testing against concavities as described above.

Figure 19:
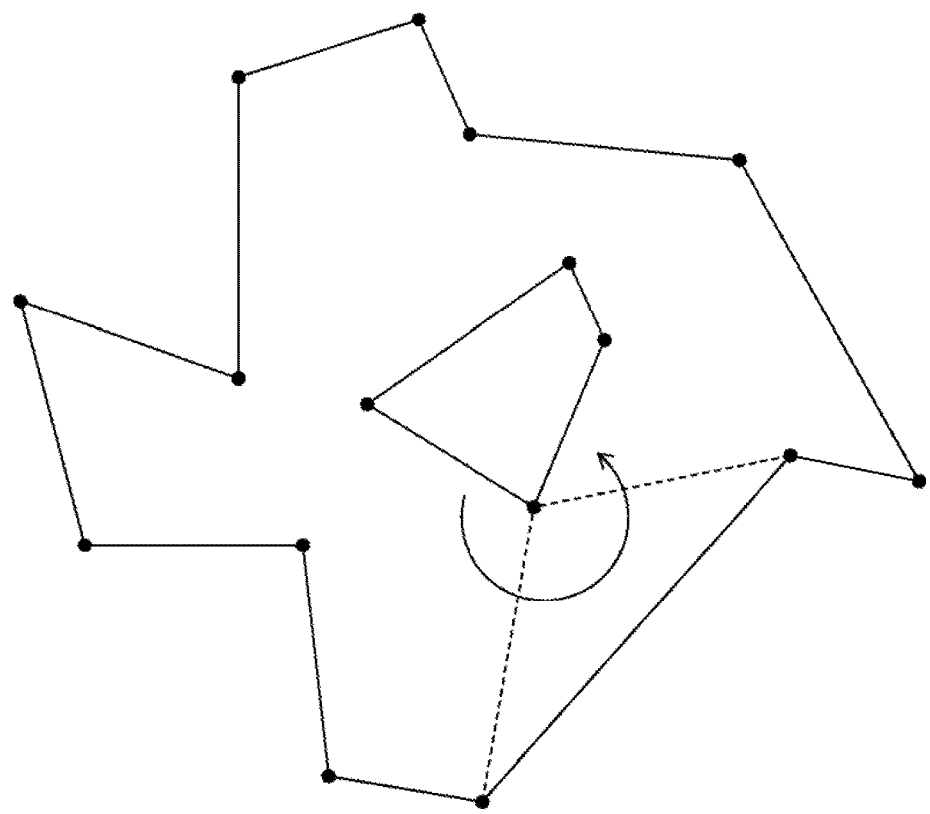
FIG. 19 illustrates visibility testing.

Given that visibility testing is not available for candidate vertices in hole boundaries, a simplified visibility test may be employed. Such a simplified visibility test may be based on checking whether the candidate triangle lies within the interior angle of the candidate vertex, as illustrated in FIG. 19.

Figure 20:
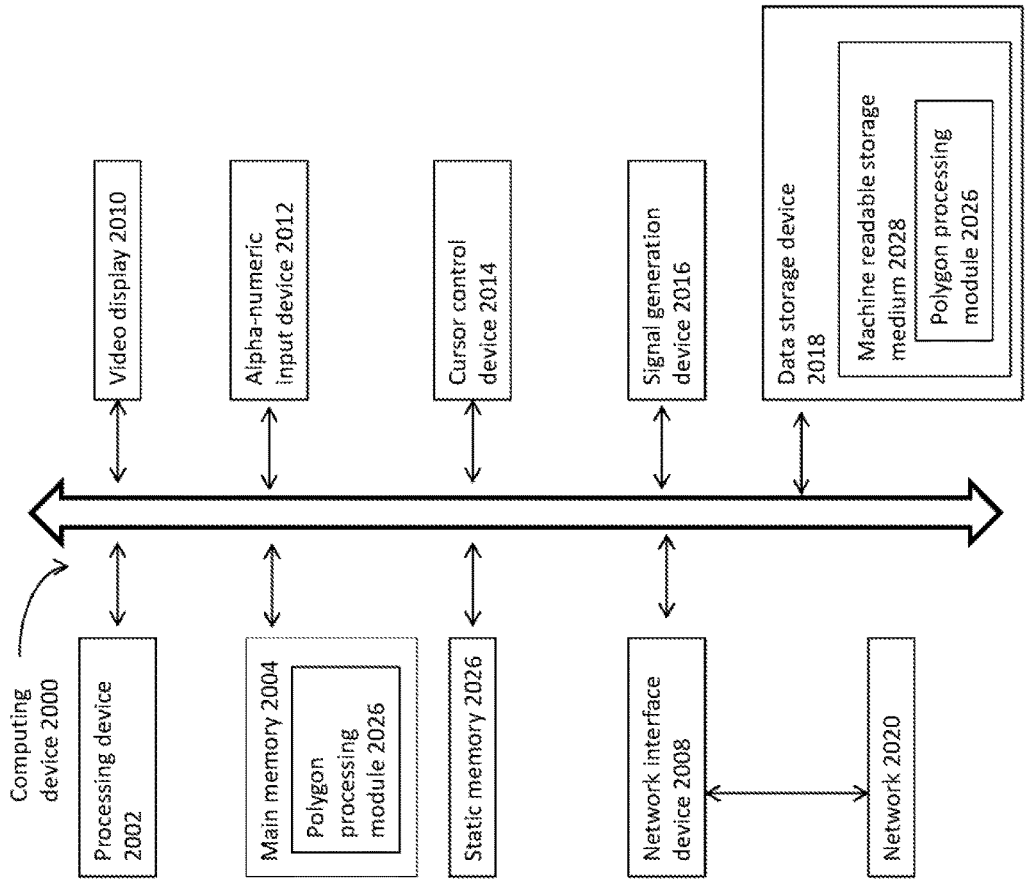
FIG. 20 is an illustration of a computing device for performing processes according to embodiments of the present specification.

Note that since hole boundaries have negative winding order, as described above, the interior angles of their vertices are within the containing polygon rather than within the hole itself FIG. 20 illustrates a diagrammatic representation of a computing device 2000 within which a set of instructions, for causing the machine to perform any one or more of the methodologies discussed herein, may be executed. The computing device 2000 may be a computing device (e.g., a server computer) within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 2000 includes a processing device (e.g., a processor) 2002, a main memory 2004 (e.g., read-only memory (ROM), flash memory, dynamic random access memory (DRAM) such as synchronous DRAM (SDRAM)), a static memory 2006 (e.g., flash memory, static random access memory (SRAM)) and a data storage device 2018, which communicate with each other via a bus 2030.

Processing device 2002 represents one or more general-purpose processing devices such as a microprocessor, central processing unit, or the like. More particularly, the processing device 2002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2002 may also be one or more special-purpose processing devices such as an application specific integrated circuit (ASIC), a field programmable gate array (FPGA), a digital signal processor (DSP), network processor, or the like. The processing device 2002 is configured to execute polygon processing module 2026 for performing the operations and steps discussed herein.

The computing device 2000 may further include a network interface device 2008 which may communicate with a network 2020. The computing device 2000 also may include a video display unit 2010 (e.g., a liquid crystal display (LCD) or a cathode ray tube (CRT)), an alphanumeric input device 2012 (e.g., a keyboard), a cursor control device 2014 (e.g., a mouse) and a signal generation device 2016 (e.g., a speaker). In one embodiment, the video display unit 2010, the alphanumeric input device 2012, and the cursor control device 2014 may be combined into a single component or device (e.g., an LCD touch screen).

The data storage device 2018 may include a computer-readable storage medium 2028 on which is stored one or more sets of instructions (e.g., instructions of a polygon processing module 2026) embodying any one or more of the methodologies or functions described herein. The polygon processing module 2026 may also reside, completely or at least partially, within the main memory 2004 and/or within the processing device 2002 during execution thereof by the computing device 2000, the main memory 2004 and the processing device 2002 also constituting computer-readable media. The instructions may further be transmitted or received over a network 2020 via the network interface device 2008.

While the computer-readable storage medium 2028 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "classifying," "reclassifying," "determining," "adding," "analyzing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

The present disclosure provides a method and means for handling of degenerate polygons which may have multiple boundaries. The method described herein is robust against degenerate input in which the directions of some polygon edges, and the angles of some vertices, cannot be reliably determined from local geometry along. Consistent and rigorous handling of geometric information can produce deterministic and well-defined results even for ill-conditioned input. This may be of particular use in triangulations of the complex faces that arise in CSG computations performed as part of destruction authoring, where degenerate complex faces with holes are common, and in general triangulation of complex 2D polygons and faces of 3D meshes in particular.

The invention claimed is:

1. A computer-implemented method comprising:
receiving an input polygon comprising at least one boundary, the at least one boundary comprising at least one vertex joining edges of the polygon boundary;
determining an edge direction for each of the edges, wherein for edges below a predetermined threshold length, determining an edge direction comprises assigning an edge direction based on edge directions of edges which can be directly computed or retrieved from a memory;
determining a signed angle of each vertex angle, the signed angle being the exterior or interior angle between the edges joined by the vertex;
wherein, if the exterior angle between the edges is −pi or pi to within a predetermined threshold, determining the signed angle of the vertex angle comprises:

assigning a sign based on the winding of the edges of the polygon boundary, a sequence of angles of polygon vertices which can be directly computed or retrieved from a memory, the geometrical property that all exterior angles of the polygon sum to −2pi or 2pi, and the known sign of the polygon area.

2. A computer implemented method according to claim 1, further comprising determining edge directions and vertex angles of edges and vertices that can be computed directly or retrieved from a memory.

3. A computer implemented method according to claim 1, wherein for a polygon having a degenerate single vertex boundary, determining a signed angle of the exterior angle of the single vertex comprises:
  assigning a magnitude of pi; and
  assigning a sign equal to the notional sign of the boundary.

4. A computer implemented method according to claim 1, further comprising,
  when the input polygon is a child polygon formed by subdividing a parent polygon for which the exterior angles have been previously determined:
  determining exterior angles of the vertices of the child polygon based on previously determined exterior angles of the parent polygon.

5. A computer implemented method according to any claim 1, comprising storing determined edge directions and determined signed angles in a memory.

6. A computer implemented method according to claim 1, further comprising performing a recursive triangulation process comprising:
  providing a first input polygon as said input polygon; and
  dividing the first input polygon into a triangle and at least one child polygon,
  providing the at least one child polygon as said input polygon, wherein the edge directions and signed vertex angles of the child polygon are determined based on the edge directions and signed vertex angles of said first input polygon.

7. A computer implemented method according to claim 1, wherein for edges below a predetermined threshold length, determining an edge direction of a triangle during triangulation comprises:
  determining the orientation of adjacent edges of the polygon boundary; and
  assigning an initial direction of the preceding adjacent edge if the vertex joining the adjacent edges is concave; and
  assigning an initial negated direction of the preceding adjacent edge if the vertex joining the adjacent edges is convex or straight.

8. A computer implemented method according to claim 1, further comprising determining winding angles of vertices of the input polygon by:
  computing a sum of a series of signed angles from a reference vertex, following edges of the polygon boundary in a selected winding direction of the polygon, where each angle term is the angle between the respective directions from the reference vertex to two successive polygon vertices, encountered in the selected winding direction.

9. A computer implemented method according to claim 8, wherein the winding angle of each vertex is determined relative to a reference direction, and the first angle in the sum of a series of signed angles is the angle between the first edge and the reference direction.

10. A computer implemented method according to claim 9, wherein if an angle between the reference direction and the first edge is below a predetermined threshold such that the reference direction and first edge are close to coincident, and if the sign of the winding angle cannot be retrieved from a memory, determining the first angle comprises:
  assigning the angle a value of −pi if the winding angle is computed in positive winding order, or a value of pi if the winding angle is computed in negative winding order.

11. A computer implemented method according to claim 10, wherein for further angle terms of the angle sum that are the signed angles between the respective directions from the reference vertex to two successive polygon vertices, in the selected winding direction:
  if a further angle term is determined to be −pi or pi to within the predetermined threshold such that the respective directions are close to opposite each other; and
  if the sign of the further angle term cannot be retrieved from a memory, determining the further angle term comprises:
    computing a tracked angle sum comprising the angle of the first edge relative to the reference direction plus the sum of the signed exterior angles of subsequent vertices; and
    assigning the sign of the further angle term based on the sign of the tracked angle sum such that if the tracked angle sum is positive, the sign of the further angle term is determined to be positive, and if the tracked angle sum is negative, the sign of the further angle term is determined to be negative.

12. A computer implemented method according to claim 11, further comprising:
  for a direction between the reference vertex and a polygon vertex wherein the distance between the reference vertex and the polygon vertex is below a predetermined tolerance threshold:
  assigning the direction such that it corresponds to the direction of the immediately preceding edge leading to the polygon vertex, or the negated edge direction of the immediately preceding edge, depending on the winding order in which the winding angle is computed.

13. A computer implemented method according to claim 1 comprising testing whether a target vertex of a one-boundary polygon is mutually visible from a reference vertex of the polygon with respect to the polygon boundary.

14. A computer implemented method according to claim 13, further comprising:
  classifying the target vertex as either in shadow or not in shadow, from the point of view of the reference vertex, wherein a target vertex that is in shadow is determined not to be visible from the reference vertex.

15. A computer implemented method according to claim 14, wherein the target vertex is classed as being in shadow if it lies within one or more shadow regions, wherein a shadow region is a part of the polygon occluded from the reference vertex by a series of one or more connected polygon edges and is bounded by a silhouette vertex, wherein a silhouette vertex is a concave vertex incident to one of the occluding edges and whose immediately incident edges both lie to one side of a viewing line constructed from the reference vertex through the silhouette vertex, such that one immediately incident edge that faces toward the reference vertex and the other immediately incident edge faces away.

16. A method according to claim 15 further comprising:
determining that a given vertex is silhouette with respect to the reference vertex if the respective angles of the pair of edges incident to the given vertex, oriented to face away from the given vertex, measured with respect to a viewing direction from the reference vertex to the given vertex, are either both positive or both negative.

17. A method according to claim 16, wherein if the angles of the pair of edges incident to the given vertex are both either –pi or pi, to within a tolerance threshold, determining which of the edges incident to the given vertex the shadow region is incident to comprises:
calculating the winding angle of the reference vertex, with respect to the negated viewing direction, in positive and negative winding order respectively; and
determining that the reference vertex is located on the side of the given vertex on which the winding angle is zero; and
determining that the shadow region lies on the opposite side of the given vertex.

18. A method according to claim 16, wherein if a vertex is determined to be silhouette, determining that the given vertex does not cast a shadow with respect to the reference vertex if the winding angle of the reference vertex around the given vertex, with respect to the negated viewing direction, following the edges on the non-shadow side of the given vertex, is non-zero.

19. A method according to claim 15, comprising testing the target vertex for inclusion in each identified shadow region by:
computing the winding angle of the target vertex around the silhouette vertex that defines that shadow region, relative to the viewing direction, following the boundary edges on the shadow side of the silhouette vertex; and
determining that the target vertex is inside the shadow region if the shadow region lies on the positive winding angle side of the silhouette vertex and the winding angle of the target vertex relative to the viewing direction is negative, or if the shadow region lies on the negative winding order side of the silhouette vertex and the winding angle of the target vertex relative to the viewing direction is positive.

20. A method according to claim 13, wherein when performing triangulation of the input polygon, the method further comprises rejecting triangles that would collide with or cross the polygon boundary by testing the visibility of a candidate triangle vertex from each of the vertices of the triangle base edge in the polygon boundary.

21. Apparatus comprising one or more processors and a memory, the memory comprising instructions that, when executed by the one or more processors, cause the apparatus to perform:
receiving an input polygon comprising at least one boundary, the at least one boundary comprising at least one vertex joining edges of the polygon boundary;
determining an edge direction for each of the edges, wherein for edges below a predetermined threshold length, determining an edge direction comprises assigning an edge direction based on edge directions of edges which can be directly computed or retrieved from a memory;
determining a signed angle of each vertex angle, the signed angle being the exterior or interior angle between the edges joined by the vertex;
wherein, if the exterior angle between the edges is –pi or pi to within a predetermined threshold, determining the signed angle of the vertex angle comprises:
assigning a sign based on the winding of the edges of the polygon boundary, a sequence of angles of polygon vertices which can be directly computed or retrieved from a memory, the geometrical property that all exterior angles of the polygon sum to –2pi or 2pi, and the known sign of the polygon area.

22. A non-transitory computer readable medium storage having instructions that, when executed by a processing device, cause the processing device to perform operations comprising:
receiving an input polygon comprising at least one boundary, the at least one boundary comprising at least one vertex joining edges of the polygon boundary;
determining an edge direction for each of the edges, wherein for edges below a predetermined threshold length, determining an edge direction comprises assigning an edge direction based on edge directions of edges which can be directly computed or retrieved from a memory;
determining a signed angle of each vertex angle, the signed angle being the exterior or interior angle between the edges joined by the vertex;
wherein, if the exterior angle between the edges is –pi or pi to within a predetermined threshold, determining the signed angle of the vertex angle comprises:
assigning a sign based on the winding of the edges of the polygon boundary, a sequence of angles of polygon vertices which can be directly computed or retrieved from a memory, the geometrical property that all exterior angles of the polygon sum to –2pi or 2pi, and the known sign of the polygon area.

* * * * *